United States Patent
Rinaldi et al.

(10) Patent No.: US 12,169,145 B2
(45) Date of Patent: *Dec. 17, 2024

(54) ZERO POWER MICROMECHANICAL SWITCH-BASED SENSING AND MONITORING SYSTEM

(71) Applicant: Northeastern University, Boston, MA (US)

(72) Inventors: Matteo Rinaldi, Boston, MA (US); Zhenyun Qian, Boston, MA (US); Vageeswar Rajaram, Boston, MA (US); Sungho Kang, Boston, MA (US)

(73) Assignee: Northeastern University, Boston, MA (US)

( * ) Notice: Subject to any disclaimer, the term of this patent is extended or adjusted under 35 U.S.C. 154(b) by 422 days.

This patent is subject to a terminal disclaimer.

(21) Appl. No.: 17/422,861

(22) PCT Filed: Jan. 21, 2020

(86) PCT No.: PCT/US2020/014478
§ 371 (c)(1),
(2) Date: Jul. 14, 2021

(87) PCT Pub. No.: WO2020/150743
PCT Pub. Date: Jul. 23, 2020

(65) Prior Publication Data
US 2022/0099495 A1 Mar. 31, 2022

Related U.S. Application Data

(60) Provisional application No. 62/794,568, filed on Jan. 19, 2019, provisional application No. 62/794,605, filed on Jan. 19, 2019.

(51) Int. Cl.
*G01J 5/00* (2022.01)
*G01J 5/02* (2022.01)
(Continued)

(52) U.S. Cl.
CPC ............. *G01J 5/0025* (2013.01); *G01J 5/026* (2013.01); *G01J 5/03* (2022.01); *G01J 5/0806* (2013.01); *G01J 5/0853* (2013.01)

(58) Field of Classification Search
CPC .. G01J 5/0025; G01J 5/026; G01J 5/03; G01J 5/0806; G01J 5/0853; G01J 5/0215;
(Continued)

(56) References Cited

U.S. PATENT DOCUMENTS 9,419,583 B2 * 8/2016 Rinaldi ................... H10N 30/85
9,712,136 B2 * 7/2017 Rinaldi ................... H03H 3/02
(Continued)

OTHER PUBLICATIONS

Rinaldi et al., Sensing Infrared Without Power, https://eri-summit.darpa.mil/docs/ERIPoster_Applications_N-ZERO_Northeastern.pdf , Jan. 1, 2018 (Year: 2018).*
(Continued)

*Primary Examiner* — David P Porta
*Assistant Examiner* — Gisselle M Gutierrez
(74) *Attorney, Agent, or Firm* — Verrill Dana, LLP

(57) ABSTRACT

Zero-power system for remote monitoring of heat sources is provided. The systems detect failure indicators of remote equipment including power substations, oil rigs, large inaccessible machinery in a factory, and communications equipment. The systems also can be used to detect the presence of people in buildings or in other locations, so as to improve HVAC utilization in large buildings. When the zero-power monitoring systems detect heat sources, such as the presence of people, failure indicators, or a targeted environmental signal, a circuit is closed using the energy of the detected radiation, and activating an RFID tag, a radio transmitter, or an alarm. The monitoring systems can remain deployed and active for many years without the need for battery replacement.

20 Claims, 21 Drawing Sheets

(51) Int. Cl.
  *G01J 5/03* (2022.01)
  *G01J 5/08* (2022.01)
  *G01J 5/0806* (2022.01)
(58) Field of Classification Search
  CPC .... G01J 5/0225; G01J 5/38; H01H 2061/006; H01H 61/013
  See application file for complete search history.

(56) References Cited

U.S. PATENT DOCUMENTS

| | | | | |
|---|---|---|---|---|
| 9,935,608 | B1* | 4/2018 | Rinaldi | G01J 5/046 |
| 10,643,810 | B2* | 5/2020 | Rinaldi | B81B 3/0029 |
| 11,557,449 | B2* | 1/2023 | Rinaldi | H01H 61/013 |
| 2015/0168648 | A1* | 6/2015 | Vercruysse | G02B 6/12007 |
| | | | | 250/206 |
| 2016/0099701 | A1* | 4/2016 | Rinaldi | H03H 9/13 |
| | | | | 422/90 |
| 2017/0170803 | A1* | 6/2017 | Rinaldi | G01J 5/20 |
| 2018/0097499 | A1* | 4/2018 | Rinaldi | H03H 9/2463 |
| 2019/0006136 | A1* | 1/2019 | Rinaldi | H01H 37/10 |
| 2020/0335294 | A1* | 10/2020 | Rinaldi | H01H 37/00 |
| 2022/0061238 | A1* | 3/2022 | Rinaldi | G01N 21/84 |
| 2022/0228918 | A1* | 7/2022 | Busnaina | G02B 1/002 |
| 2022/0364919 | A1* | 11/2022 | Rinaldi | G01J 5/40 |

OTHER PUBLICATIONS

Kang et al., Ultra Narrowband Infrared Absorbers for Omni-Directional and Polarization Insensitive Multi-Spectral Sensing Microsystems, Jun. 2017, Transducers 2017, pp. 886-889 (Year: 2017).*

Qian et al, Zero-power infrared digitizers based on plasmonically enhanced micromechanical photoswitches, Oct. 2017, Nature Nanotechnology, vol. 12, pp. 969-974 (Year: 2017).*

Rajaram et al., A False Alarm-Free Zero-Power Micromechanical Photoswitch, 2018 IEEE Sensors, Oct. 2018, pp. 1-4 (Year: 2018).*

Holsman, DARPA's New Infrared Smart Sensor CanOperate with "Near-Zero" PowerConsumption, https://www.allaboutcircuits.com/news/darpa-plasmonic-infrared-smart-sensor-operate-near-zero-power-consumption/, Oct. 2017 (Year: 2017).*

Shankar, M. et al., "Human-tracking systems using pyroelectric infrared detectors," Optical Engineering, vol. 45, No. 10, Oct. 2006, 10 pgs.

Olsson, R.H. et al., "Event Driven Persistent Sensing: Overcoming the Energy and Lifetime Limitations in Unattended Wireless Sensors," 2016 IEEE Sensors, 2016, 3 pgs.

Qian, Z. et al., "Zero-power infrared digitizers based on plasmonically enhanced micromechanical photoswitches," Nature Nanotechnology, vol. 12, No. 10, Sep. 2017, pp. 969-973.

Qian, Z. et al., "Zero-power light-actuated micromechanical relay," IEEE MEMS 2017, Las Vegas, NV, USA, Jan. 22-26, 2017, pp. 940-941.

Rajaram, V. et al.,"MEMS-Based Near-Zero Power Infrared Wireless Sensor Node," IEEE MEMS 2018, Belfast, Northern Ireland, UK, Jan. 21-25, 2018, pp. 17-20.

Rajaram, V. et al.,"Microelectromechanical detector of infrared spectral signatures with near-zero standby power consumption," 19th International Conference on Solid-State Sensors, Actuators and Microsystems (Transducers) 2017, Kaohsiung, Taiwan, Jun. 18-22, 2017, pp. 846-849.

Kang, S. et al.,"Ultra narrowband infrared absorbers for omni-directional and polarization insensitive multi-spectral sensing microsystems," 19th International Conference on Solid-State Sensors, Actuators and Microsystems (Transducers) 2017, Kaohsiung, Taiwan, Jun. 18-22, 2017, pp. 886-889.

Paoletti, G. J. et al., "Monitoring of electrical equipment failure indicators and zero-planned outages: Past, present and future maintenance practices," 61st IEEE Pulp and Paper Industry Conference (PPIC), 2015, 10 pgs.

Texas Instruments, Low-Power PIR Motion Detector With Sub-1GHz Wireless Connectivity Enabling 10-Year Coin Cell Battery Life, 2016. [Online]. Available: www.ti.com/lit/ug/tiduau1b/tiduau1b.pdf.

Singameneni, S. et al., "Polymer-Silicon Flexible Structures for Fast Chemical Vapor Detection", Advanced Materials, 19.23, (2007), pp. 4248-4255, doi: 10.1002/adma.200701419.

Zhang, J. et al., "A Review of Passive RFID Tag Antenna-Based Sensors and Systems for Structural Health Monitoring Applications," Sensors, vol. 17, No. 2, Jan. 2017, 33 pgs. doi:10.3390/s17020265.

* cited by examiner

ZERO POWER MICROMECHANICAL SWITCH-BASED SENSING AND MONITORING SYSTEM

CROSS-REFERENCE TO RELATED APPLICATIONS

This application claims priority to U.S. Provisional Application No. 62/794,568, filed 19 Jan. 2019, the entirety of which is incorporated herein by reference, and this application claims priority to U.S. Provisional Application No. 62/794,605, filed 19 Jan. 2019, the entirety of which is incorporated herein by reference.

BACKGROUND

Much of the energy currently used to heat, cool, and ventilate buildings used when buildings are either not occupied, or occupied well under the maximum levels they are designed for. Sensor systems for human presence sensing and people counting can drastically improve the efficiency of heating, ventilation, and air conditioning (HVAC) in commercial buildings based on the demand, and therefore result in a significantly lower usage of energy without any impact to comfort of the occupants. However, a user-transparent sensor system with the required accuracy, reliability, and cost to deliver such substantial energy savings is currently not available.

Ventilation control based on sensor systems that can accurately count the number of humans in a pre-determined zone has been identified as the most effective way to reduce energy usage in commercial buildings. Most large buildings are outfitted with variable speed fans for controlling the amount of ventilation delivery, and these fan speeds can be adjusted to use more or less energy, depending on the ventilation needs. Conventional passive infrared (PIR) sensors detect people moving within a field of view, and thus infer indirectly whether a space is occupied or not. This approach results in a high false-negative rate when people stop moving and it cannot be used to effectively count people. Several sensing technologies have been proposed for people counting, including video surveillance and Bluetooth tracking. The former requires significant data processing and causes security/privacy concerns. The latter one requires the occupant to carry a powered item with the proper communication protocol enabled (acts as a "beacon"), which is not practical in many cases. Recently, RF imaging based on RFID tags and readers has been proposed to implement people counting. Although it features lower cost and better privacy protection compared to optical imaging, the requirements of sophisticated signal processing, numerous RFID tags in 3D space and potentially different implementation and calibration process for different rooms make such an approach less appealing.

IR-based human detection technologies have been extensively used in motion-triggered automation, indoor/outdoor security, search-and-rescue and many other applications [1]. However, the relatively high-power consumption of state-of-the-art motion detectors limits their battery life and increases the maintenance cost of sensor networks deployed in remote or hazardous locations. For instance, commercial off-the-shelf motion detectors based on a pyroelectric IR sensor consume about 200 µW continuously in standby [2]. Their lifetime is limited to less than one year (powered by a coin battery) when deployed in regions where energy harvesting is not available. The constant power consumption is attributed to the use of active electronics for signal conditioning and processing which accounts for the great majority of total consumed power. The high maintenance cost associated with limited sensor lifetime has been a major limiting factor for the implementation of high capacity sensor networks for security monitoring in regions such as tunnels, underground facilities and national borders. Driven by the growing need for persistent monitoring with long sensor lifetime, efforts have been devoted into developing completely-passive switch-based sensors capable of digitizing the signal of interests without using active electronics [3-4].

Many types of remote equipment require monitoring and produce heat or high humidity when equipment fails or when failure is imminent. Power substations and switchyards have many complex electrical systems and equipment that handle very high voltage. Keeping substations and switchyards online requires regular predictive maintenance to isolate conditions that indicate impending failure. High humidity, exceptionally high temperature, and localized heating are the three major indicators of failure. Therefore, continuous monitoring of these physical quantities is required to isolate conditions that indicate impending failure and perform regular PdM based on the collected data. Conventional sensors consume power constantly to monitor these parameters, and consequently they require operators to access the energized equipment and perform regular planned shutdowns to do sensor maintenance and replace dead batteries, which not only reduces the up time of the equipment but it also increases the cost of maintenance and the associated safety hazards.

Thus, there is a need for sensors for heat and humidity that can be deployed throughout buildings and in remote locations with low or no power consumption.

SUMMARY

Zero-power system for remote monitoring of heat sources is provided. The systems detect failure indicators of remote equipment including power substations, oil rigs, large inaccessible machinery in a factory, and communications equipment. The systems also can be used to detect the presence of people in buildings or in other locations, so as to improve HVAC utilization in large buildings. When the zero-power monitoring systems detect heat sources, such as the presence of people, failure indicators, or a targeted environmental signal, a circuit is closed using the energy of the detected radiation, and activating an RFID tag, a radio transmitter, or an alarm. The monitoring systems can remain deployed and active for many years without the need for battery replacement.

One aspect of the technology is a device for monitoring a heat emission. The device includes: (i) one or more zero power infrared (IR) sensors, each sensor including a first plasmonic absorber tuned to a selected wavelength range of IR radiation and including a switch actuatable using only energy of IR radiation absorbed by the plasmonic absorber; wherein the one or more zero power IR sensors are disposed within a circuit in series or in parallel, and wherein the circuit is interruptable by the switch of each sensor; (ii) a transmitter disposed within the circuit and activatable by a selected configuration of said switches; and (iii) optionally a battery disposed within the circuit, the battery capable of powering the transmitter. Absorption by the one or more sensors of selected wavelengths of IR radiation originating from an object emitting heat at a level and wavelength characteristic of a source of the heat emission causes the transmitter to transmit an electromagnetic radiation signal.

The source of heat emission can be, for example, human bodies within a building, power transmission equipment, power generation equipment, communications equipment, a pump, a generator, a boiler, HVAC equipment, oil extraction equipment, or factory equipment.

Another aspect of the technology is a system for monitoring a heat source or potential heat generation source. The system includes: (i) a plurality of devices as described above; and (ii) a receiver or RFID reader capable of monitoring transmissions from the plurality of devices. The system may also include (iii) a processor and a memory capable of storing and/or analyzing information captured by the receiver or RFID reader. The system can still further include an alarm, a camera, a cooling system, or a controller of the heat source activatable by the processor in response to information captured by the receiver or RFID reader signaling out of range heat production by the heat source. The system also can include further sensors for detecting an increase in humidity, temperature, or sound.

Yet another aspect of the technology is a kit for monitoring a heat source or potential heat generation source. The kit contains a plurality of devices as described above or the system described above and instructions for deploying and using the devices or the system.

Still another aspect of the technology is a method of monitoring a heat source or potential heat generation source. The method includes the steps of: (a) deploying a plurality of devices as described above, or the system described above, or the kit described above in a location within a distance from the heat source or potential heat generation source suitable for detecting a condition of the heat source using the devices; and (b) periodically monitoring the devices. The method can further include alerting a repair service, inactivating the heat source or activating fire prevention measures.

The technology can be further summarized in the following list of features.

1. A device for monitoring a heat source, the device comprising:
   (i) one or more zero power infrared (IR) sensors, each sensor comprising a first plasmonic absorber tuned to a selected wavelength range of IR radiation and comprising a switch actuatable using only energy of IR radiation absorbed by the plasmonic absorber; wherein the one or more zero power IR sensors are disposed within a circuit in series or in parallel, and wherein the circuit is interruptable by the switch of each sensor;
   (ii) a transmitter disposed within the circuit and activatable by a selected configuration of said switches; and
   (iii) optionally a battery disposed within the circuit, the battery capable of powering the transmitter;
   wherein absorption by the one or more sensors of selected wavelengths of IR radiation originating from the heat source and characteristic of a heat emission from the source causes the transmitter to transmit an electromagnetic radiation signal.
2. The device of feature 1, wherein the device comprises four or more of said zero power IR sensors, each comprising a plasmonic absorber tuned to a different selected wavelength range of IR radiation, wherein the switch of each of the four or more sensors is set to a different selected activation power, and wherein the device functions as an IR analyzer with at least 4 bit resolution.
3. The device of feature 2, wherein the radio transmission from the device is activated when said IR radiation originating from a heat source satisfies selected IR spectral criteria characteristic of detection of the heat source or an out of range heat emission from the heat source.
4. The device of any of the preceding features, wherein the selected wavelength range of IR radiation of the one or more sensors is independently selected from a range from about 1.3 microns to about 2.8 microns (SWIR), or a range from about 4 microns to about 5.5 microns (MWIR), or a range from about 8 microns to about 14 microns (LWIR).
5. The device of feature 4, wherein the device detects LWIR radiation emitted by a human body.
6. The device of feature 4, wherein at least one sensor of the device comprises a second plasmonic absorber tuned to a different IR wavelength range than the first plasmonic absorber, and relative absorption of IR radiation by the first and second plasmonic absorbers determines an open/closed state of the sensor switch.
7. The device of any of the preceding features, wherein one or more of the sensors comprises a heater operative to reset the sensor switch.
8. The device of any of the preceding features, wherein the device comprises one or more sensors for detection of elevated temperature, elevated humidity, one or more volatile organic compounds, or sound.
9. The device of any of the preceding features, wherein the sensors have an OFF-to-ON switch state transition with a conductance ratio $>10^{12}$.
10. The device of any of the preceding features, further comprising a focusing lens for collecting said infrared radiation.
11. The device of any of the preceding features, wherein the one or more sensors comprise switches that are always open or always closed in the absence of said selected range of IR radiation.
12. The device of any of the preceding features, wherein the transmitter is an RFID tag activatable by an altered switch status of a sensor of the device.
13. The device of feature 12, wherein the device does not comprise a battery.
14. The device of any of features 1-12, wherein the transmitter is a radio transmitter and the device comprises said battery.
15. The device of any of the preceding features, wherein a sensor of the device comprises a switch having first and second contacts with an engineered adhesion force or latching force, such that the first contact and the second contact stably adhere after the contacts close, thereby providing a memory function wherein the sensor switch remains in the closed contact position after an incoming signal dissipates.
16. The device of any of the preceding features, wherein the heat source or potential heat generation source is selected from the group consisting of human bodies within a building, power transmission equipment, power generation equipment, communications equipment, a pump, a generator, a boiler, HVAC equipment, oil extraction equipment, and factory equipment.
17. A system for monitoring a heat source or potential heat generation source, the system comprising:
   (i) a plurality of devices of any of the preceding features; and
   (ii) a receiver or RFID reader capable of monitoring transmissions from the plurality of devices.
18. The system of feature 17, further comprising:
   (iii) a processor and a memory capable of storing and/or analyzing information captured by said receiver or RFID reader.

19. The system of feature 18, further comprising:
   (iv) an alarm, a camera, a cooling system, a controller of the heat source, a controller of an HVAC system, or a fire prevention system.
20. The system of any of features 17-19, wherein the system comprises one or more zero power IR sensors and at least one other type of sensor.
21. The system of feature 20, wherein the other type of sensor detects temperature, humidity, or sound.
22. The system of any of features 17-21, wherein the devices of the system do not comprise any batteries.
23. The system of any of features 17-22, wherein the plurality of devices are distributed at fixed positions near a plurality of heat sources or potential heat generation sources in an industrial facility, power transmission facility, power generation facility, oil rig or oil field, or a building.
24. The system of any of features 17-23, wherein the plurality of devices can be deployed at fixed positions in a facility or building and remain operative for at least 3 years, or at least 5 years, or at least 10 years.
25. A kit for monitoring a heat source or potential heat generation source, the kit comprising a plurality of devices of any of features 1-16, or the system of any of features 17-24, and instructions for deploying and using the devices or the system.
26. A method of monitoring equipment in a facility, the method comprising:
   (a) deploying a plurality of devices of any of features 1-16, or the system of any of features 17-24, or the kit of feature 25 in the facility within a distance from the equipment suitable for detecting an out of range heat generation of the equipment using the devices; and
   (b) periodically monitoring the devices.
27. The method of feature 26, wherein said monitoring comprises detecting transmissions from the devices or probing the devices with an RFID reader.
28. A method of monitoring people in a building, the method comprising:
   (a) deploying a plurality of devices of any of features 1-16, or the system of any of features 17-24, or the kit of feature 25 in the building within a space likely to be occupied by people; and
   (b) periodically monitoring the devices to determine occupancy of the space.
29. The method of feature 28, wherein said monitoring comprises detecting transmissions from the devices or probing the devices with an RFID reader.
30. The method of feature 28 or 29, further comprising activating or deactivating an HVAC system according to the determined occupancy of the space.

BRIEF DESCRIPTION OF THE DRAWINGS

FIG. 7A shows an embodiment of a device containing a logic circuit utilizing two zero power IR sensors. The circuit diagram at the top shows that the device detects the absence of $NO_2$ combined with the presence of $CO_2$, useful for detecting flame but not an exhaust plume of an internal combustion engine. Infrared emission spectra in the MWIR region (3-8 μm) are shown for a flame, an exhaust plume, and a blackbody.

DESCRIPTION

Figure 1:
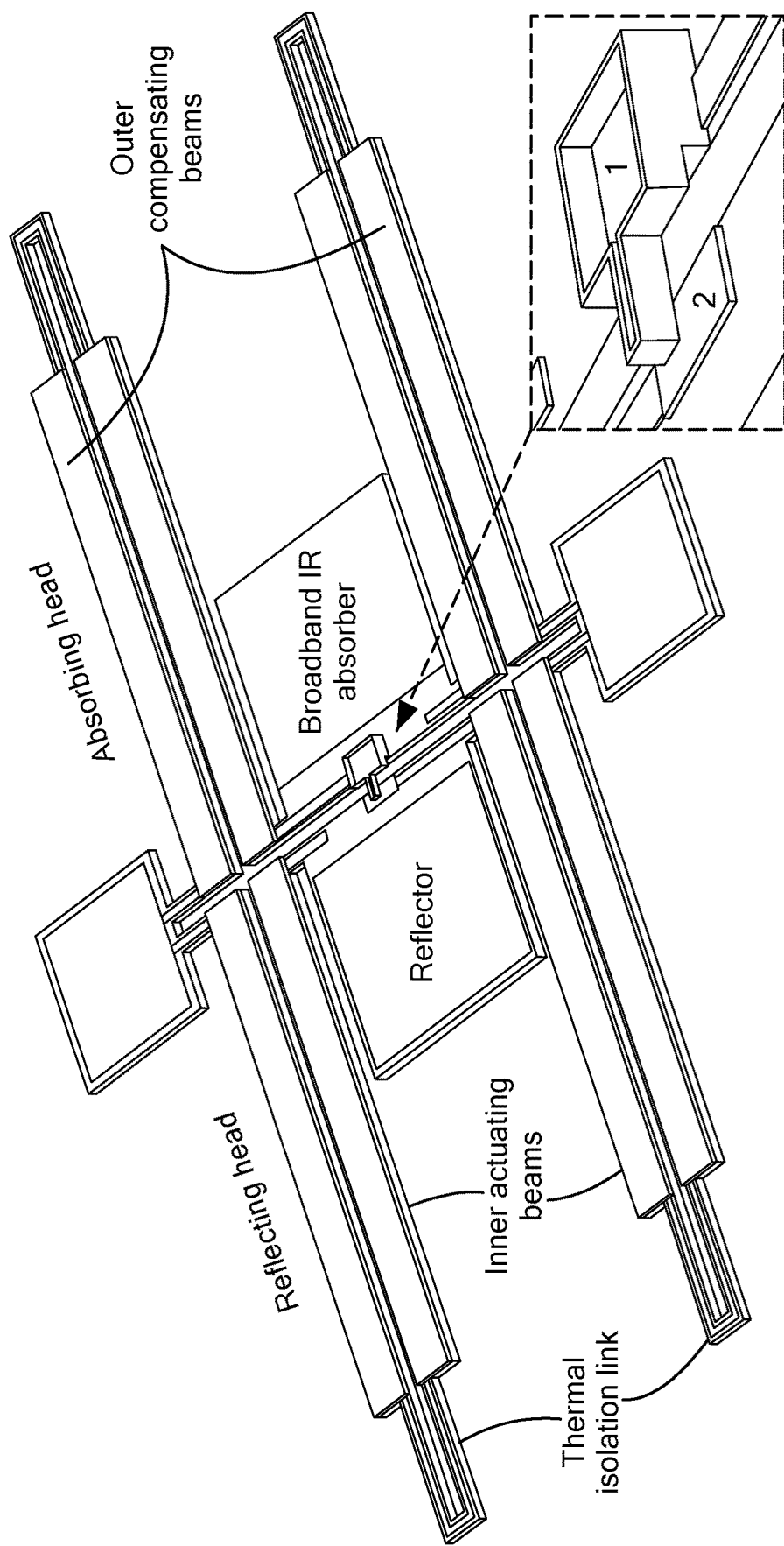
FIG. 1 shows a schematic illustration of a zero-power infrared sensor. The inset shows the contact region in which electrical contacts 1 and 2 are shown in the open position.

The present technology is directed to zero-power monitoring systems that comprise micromechanical switches that consume no power while monitoring remote equipment for failure indicators, while monitoring for human or animal presence, or, for example, while monitoring for vehicles. The zero-power monitoring systems can be used to detect the presence of people in buildings or in other locations, for example, to improve heating ventilation and air conditions (HVAC) utilization in large buildings. When the zero-power monitoring systems detect the presence of people, or detect a targeted environmental signal, a circuit can be closed, activating for example, an RFID tag, a radio transmitter, or an alarm. The zero-power micromechanical switches can be configured for zero-power usage and such that no maintenance or battery changing is required, and the zero-power monitoring systems can remain deployed and active for many years.

The present technology can provide ultra-miniaturized (e.g., coin size), low-cost and easily retrofitted battery-free sensor radio-frequency identification (RFID) tags capable of passively detecting human bodies from the ceiling of a heating, ventilation, and air conditioning (HVAC) equipped room, and communicating the data wirelessly to existing HVAC control systems though an RFID reader. The sensors utilize the energy of the infrared (IR) radiation emitted from a human body to operate and determine the presence of people within a detection range without consuming any electrical power. Several such battery-less sensor nodes with relatively narrow sensing field of view can be attached to a ceiling to cover the entire room. The occupancy is determined based on the number of sensors that are activated by the human body radiation. An RFID reader, integrated in a thermostat or a light switch in the same room, interrogates all the sensor nodes with an optimal duty cycle and provides real-time occupancy data to the HVAC control system. A simplified system with less sensor nodes but wider field of view for each sensor can also be used for presence sensing in residential buildings, where head count is not required but low cost and ease of installation are critical. This technology dramatically reduces the amount of energy used for HVAC in both commercial and residential buildings, which aligns with global energy saving objectives, for example, of the Saving Energy Nationwide in Structures with Occupancy Recognition (SENSOR) program recently initiated by the Advanced Research Projects Agency-Energy (ARPA-E).

An ultra-miniaturized (coin size), low-cost and easily retrofitted wireless sensor cluster is provided, which is capable of continuously monitoring the appearance of failure indicators in equipment and in remote locations. The wireless sensor cluster wakes up (i.e. drains power from the battery) only upon detection of changes in the environmental failure indicators, above alarming thresholds to transmit a radio frequency signal indicating the impending failure event. The wireless sensor cluster can be easily retrofitted inside the panel of the energized equipment and, thanks to the complete elimination of the standby power consumption, it is able to wirelessly reveal thousands of impending failure events without ever replacing the sensor coin battery (life time extended to ~10 years, limited by the battery self-discharge).

Sensors of the present technology utilize the zero-power pasmonic MEMS device technology described in WO 2017/

082985 A2, which is hereby incorporated by reference in its entirety. The sensor comprises: a base having a thin vertical Z dimension and larger horizontal X/Y dimensions, the base defining a horizontal base plane in the X and Y axes. Each side of the nearly symmetrical device possesses a head and two pairs of flexible "legs" or beams, each containing a substrate with a first coefficient of expansion overlayered by a second material with a second, different coefficient of expansion. Each pair of flexible resonant cantilever beams includes an outer compensating beam positioned parallel to an inner actuating beam. The proximal end of each outer compensating beam is attached to the base by a base joint; and the proximal end of each actuating beam is attached to the head. The distal end of each outer compensating beam attached to the distal end of each inner actuating beam by a thermal isolation region. The sensor comprises a first head adjacent to a second head at the horizontal base plane, each head having an affixed electrical contact, such that a sufficient vertical movement or bending of either head will bring the two electrical contacts to a closed position or alternatively will separate the two electrical contacts to open position.

The first coefficient of expansion and the second coefficient of expansion can both be coefficients of thermal expansion; the second coefficient of expansion of the second material can be larger than the first coefficient of expansion of the substrate, and the differential resonance can be differential thermal bending due to the larger second coefficient of expansion of the second material.

The first coefficient of expansion and the second coefficient of expansion can both be coefficients of expansion due to humidity. For example, the substrate can contain aluminum with a low coefficient of humidity expansion, overlayered with a second material containing a polymer that expands and contracts in correlation to increasing and decreasing humidity. The second material can comprise, for example, polymers of a plasma-polymerized methacrylonitrile.

The second coefficient of expansion of the second material can be larger than the first coefficient of expansion of the substrate, and the differential expansion can lead to differential bending due to the larger second coefficient of expansion of the second material.

Bending of the compensating beams can provide thermal compensation, which maintains the alignment of the heads, maintaining their ability to respond to radiation absorbed by a plasmonic absorber without disturbance from environmental temperature or humidity changes.

The electrical contact affixed to the first head and the electrical contact affixed to the second head can have a gap less than about 1 micron, for example, from about 1 nm to about 500 nm in the open position.

At least one of the heads can be coated with a patterned plasmonic absorber material designed to absorb specific wavelengths of radiation, such as IR radiation. The plasmonic absorber head is operative to absorb a first target signal comprising a first bandwidth of infrared radiation and to convert at least a portion of the first bandwidth of infrared radiation to heat energy. The heat energy can be conducted from the first head through the two head joints to the two attached inner actuating beams. The heat energy can cause a thermal differential between the two inner actuating beams and the two outer compensating beams. The thermal differential can cause a differential bending between the two inner actuating beams and the two outer compensating beams, such that there can be sufficient vertical movement of the first head to close or to open the sensor.

The bandwidth of infrared radiation detected by the present sensors can be, for example, about 8 microns to about 14 microns. A second bandwidth of infrared radiation can be about 6 microns to about 12 microns such that the switch is configured to capture the difference between the first bandwidth and the second bandwidth, which peaks at about 8 microns with a wide spread from about 6 microns to about 12 microns in order to discriminate the human body radiation from the background radiation (i.e. radiation from the floor). Without a focusing lens, the switch can be operative up to about 1 meter from the source of a bandwidth of infrared radiation. Further comprising a focusing lens for collecting a said bandwidth of infrared radiation, the focusing lens can make the switch operative to enable detection of a human up to about 5.7 meters away.

The switch can comprise a substrate with a first coefficient of expansion comprising $SiO_2$ with a thickness of about 2 microns. The switch can comprise the second material with a second coefficient of expansion comprising aluminum with a thickness of about 1 micron. The first of the second head can comprise a reflector. Optionally, a reflector can have a thermal heater underneath.

The first or second head can comprise an electrical heater operative to convert electrical energy to heat energy; the heat energy conducted from the second head, for example, to the two head joints to the two inner actuating beams, causing the temperature of the two inner actuating beams to be higher than the temperature of the outer compensating beams, and the differential in temperature causing a differential bending between the two inner actuating beams and the two outer compensating beams.

The differential bending between the two inner actuating beams and the two outer compensating beams can cause the second head to lower in relation to the first head and in relation to the base plane and causes the contact affixed to the second head to lower away from the contact affixed to the first head, opening the closed contact position, if the first and contacts were in the closed contact position, or opening the latched or adhered closed contact position with the contact, if the first and contacts were latched or adhered in the closed contact position.

Utilizing the electrical heater, the conversion of electrical energy to heat energy in the electrical heater can comprise an electrical heater pulse of about 0.65V for about 300 milliseconds.

The electrical contacts of the switch can comprise platinum. The electrical contacts of any switches herein can comprise an engineered adhesion force or latching force such that the electrical contacts adhere or become latched together after the open contact position is brought to the closed contact position, thereby causing a memory function wherein the switch remains in the closed contact position after the target signal is dissipated.

The switches herein can further comprise an RFID tag configured for activation by closing of a circuit attached to the switch, and wherein the circuit consumes no power. The switches herein can further comprise a radio transmitter and a battery, the radio transmitter configured for activation by closing of a circuit attached to the switch, or further comprising a wireless microcontroller, a load switch, and a battery, the load switch and the wireless microcontroller configured for activation by closing of a circuit attached to the switch. The circuit can consume no power until the pair of electrical contacts is brought to the closed position.

The switches disclosed herein can be wherein the switch is utilized as a human or animal counter, an intrusion detector, a trespasser detector, a remote tracking device, a telemetry device, a vehicle detector, a heat detector or a heat signature detector, or a remote patient monitor.

The switches herein can be wherein the switch is for sensing and digitizing a target change in temperature above a set threshold, and wherein the substrate with a first coefficient of expansion comprises $SiO_2$ and the second material with a second coefficient of expansion comprises aluminum. The switches herein can be wherein the switch is for sensing and digitizing a target change in humidity above a set threshold, and wherein the substrate with a first coefficient of expansion comprises aluminum and the second material with a second coefficient of expansion comprises a polymer thin film capable of moisture induced expansion, said polymer thin film optionally comprising a plasma-polymerized methacrylonitrile.

An RFID system for counting human subjects in a building space is disclosed herein, the system comprising: (i) a plurality of switches comprising RFID tags, the switches distributed on a ceiling of the building space, each switch configured for detecting infrared radiation emitted by a subject in a defined space below the detector and activating the RFID tag of the detector; and (ii) an RFID reader configured for detecting the activated RFID tags and transmitting or providing data concerning subject number and/or subject position in the building space. An RFID reader configured for use in the system can be configured in the form of a light switch. The system can be utilized to improve the efficiency of a HVAC system.

A radio transmission system for counting human subjects in a building space is disclosed herein, the system comprising: (i) a plurality of switches comprising radio transmitters, the switches distributed on a ceiling of the building space, each switch configured for detecting infrared radiation emitted by a subject in a defined space below the detector and activating the radio transmitter of the detector; (ii) a radio receiver configured for detecting the activated radio transmitters and transmitting or providing data concerning subject number and/or subject position in the building space. The data can be in the form of time-stamped maps or a movie.

A kit for counting human subjects in a building space is disclosed herein, the kit comprising instructions and: one or more of the switches disclosed herein; and an RFID reader; or a radio receiver.

The switches disclosed herein can be configured wherein the bandwidth of infrared radiation is selected to reject infrared radiation in the long wavelength infrared (LWIR) spectral range. The switches herein can further comprise a second switch wherein the second head absorbs at about 3.5 microns and the first head absorbs in a range from about 4.25 to about 4.5 microns, forming a Not/And junction such that the pair of electrical contacts are in the open position preventing false alarm in response to flame/plume/blackbody infrared radiation.

By combining switches disclosed herein, a sensor for detecting temperature, humidity, and infrared changes can be configured, the sensor comprising a 3-bit condition switch, the 3-bit condition switch comprising the temperature, humidity, and IR switches herein. The 3-bit condition switch can further comprise an additional sensor comprising a switch wherein the second head absorbs at about 3.5 microns and the first head absorbs in a range from about 4.25 to about 4.5 microns, forming a Not/And junction such that the pair of electrical contacts are in the open position preventing false alarm in response to flame/plume/blackbody infrared radiation. The sensor can further comprise an RFID tag activated by closure of the 3-bit condition switch (or the 4-bit condition switch), forming an RFID monitoring system. The RFID tag can be zero power. A radio transmitter can be utilized, the radio transmitter activated by closure of the 3-bit (or 4-bit) condition switch, making a radio monitoring system. The radio transmitter can be low power, only consuming power when activated. The RFID or radio monitoring system can be utilized for monitoring the condition of equipment in a remote location, a power station, a power distribution station, a power substation, a factory, an airliner, a remote building, a large piece of heavy machinery, a ship, an oil platform, a petroleum refinery, a pipeline, a railway, a drone, an antenna, or a beacon.

The switches can be provided in kits. The kits can be configured as kits for intrusion detection, for detection of a trespasser, for remote tracking, for telemetry, for vehicle detection, for heat detection or heat signature detection, or for remote patient monitoring.

The kits can be configured for monitoring the condition of equipment in a remote location, a power station, a power distribution station, a factory, an airliner, a remote building, a large piece of heavy machinery, a ship, an oil platform, a petroleum refinery, a pipeline, a railway, an airliner, a drone, an antennae, or a beacon, the kit comprising instructions and: one or more of the switches or sensors herein; and an RFID reader; or a radio receiver.

Methods of detecting a human or an animal are disclosed herein, the methods comprising distributing the switches disclosed herein and monitoring the switches using an RFID reader or a radio receiver.

Methods of making the switches herein are disclosed, the methods comprising: providing a substrate with a microscale Z dimension, optionally about 2 microns, the substrate comprising, for example, silicon dioxide, a top or device side, and a backside or bottom side; etching structures and depositing layers on the top or device side; releasing areas of the substrate by utilizing backside release based on deep reactive ion etching or by utilizing dual doped tetramethylammonium hydroxide (TMAH) wet release. The switches disclosed herein can be deployed and remain active for about up to 10 years, about up to 20 years, or about up to 30 years.

Figure 22:
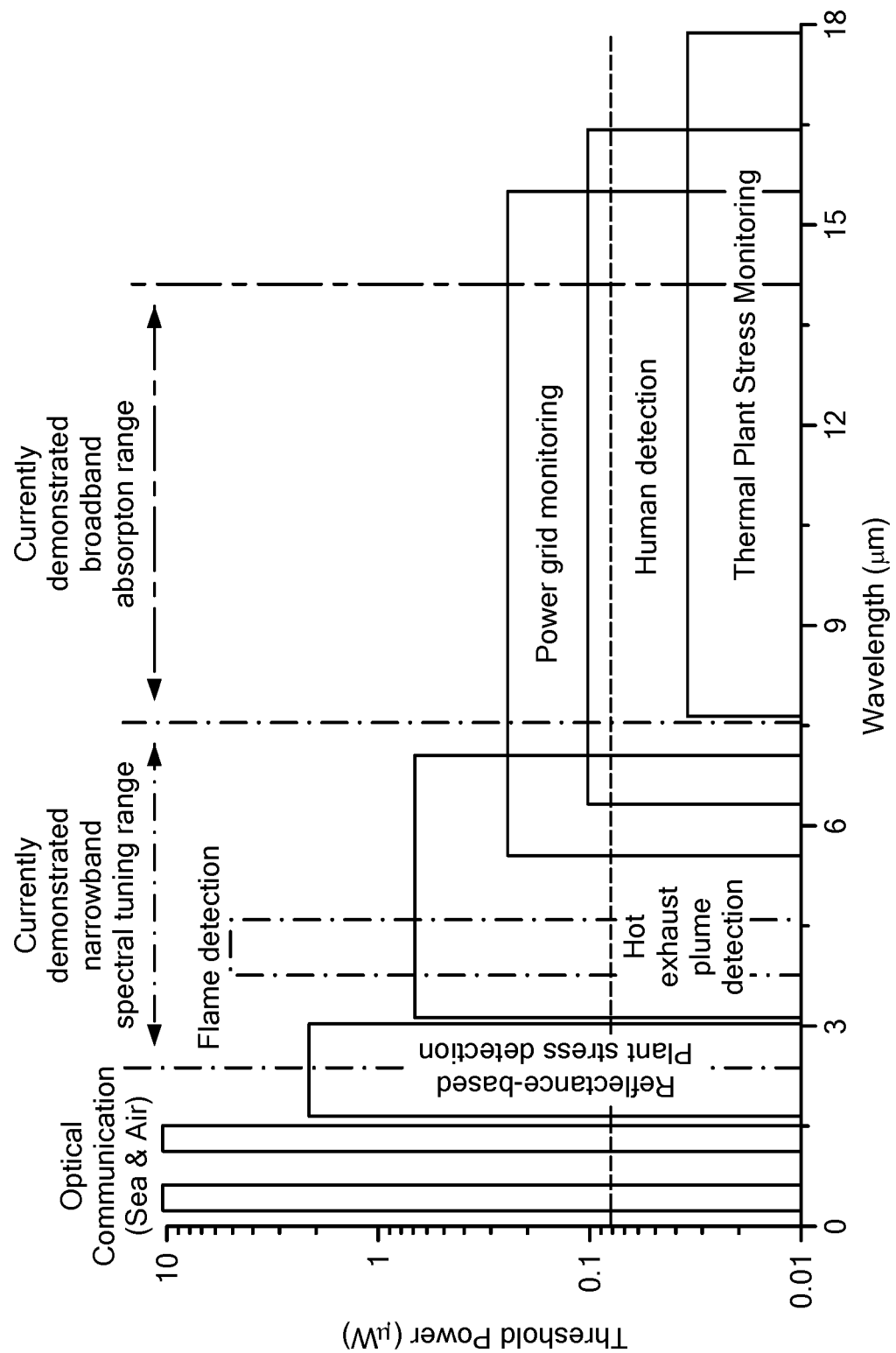
FIG. 22 illustrates certain IR wavelengths and their uses in conjunction with zero power IR sensors.

As used herein, short-wavelength infrared (SWIR) refers to wavelengths from about 1.4-3 microns, frequencies from about 100-214 THz, or photon energies from about 413-886 meV. Mid-wavelength infrared (MWIR) refers to wavelengths from about 3-8 microns, frequencies from about 37-100 THz, and photon energies from about 155-413 meV. Long-wavelength infrared (LWIR) refers to wavelengths from about 8-15 microns, frequencies from about 20-37 THz, and photon energies from about 83-155 meV. Far infrared refers to wavelengths from about 15-1000 microns, frequencies from about 0.3-20 THz, and photon energies from about 1.2-83 meV. Near infrared refers to wavelengths from about 0.75-1.4 microns, frequencies from about 214-400 THz, and photon energies from about 886-1653 meV (FIG. 22). Infrared radiation is utilized herein as an example of the present technology. The present technology is not limited to IR radiation and can be applied to any radiation that can actuate the zero-power micromechanical switches herein.

The present technology provides zero-power micromechanical switches that can remain in standby mode for many years, while monitoring to signal presence of a targeted environmental signal. The micromechanical switch can be selectively triggered by an above-threshold variation in the intensity of a specific environmental signal such as, radiation, temperature, or humidity. The switch selectively harvests the energy contained in the specific environmental signal of interest and uses it to mechanically create a conducting channel between two electrical contacts (i.e. a large and sharp OFF-to-ON state transition with ON/OFF conductance ratio >10$^{12}$ and a practically infinite subthreshold slope) when the strength of the signal is above a predetermined threshold, without the need of any additional power source.

Figure 7A:
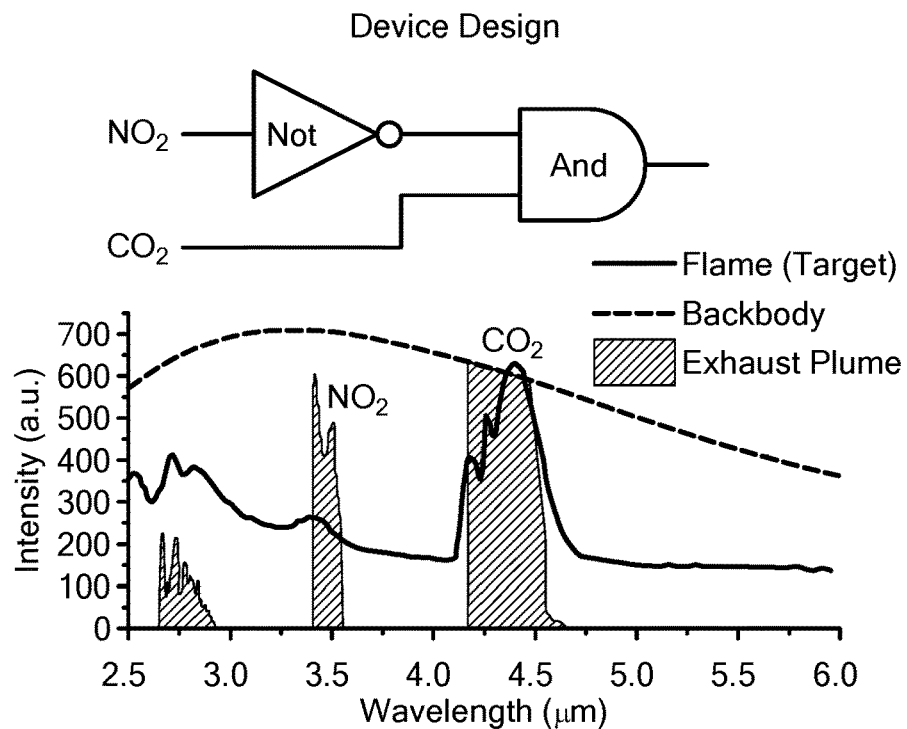
FIG. 7A illustrates the wavelengths (μm) and intensities of NO2 and CO2 infrared emissions from a flame in the MWIR region (3-8 μm) and infrared from an exhaust plume at about 2.75 μm. An electrical circuit is illustrated at top. The circuit illustrates the logic behind designing a switch that would not comprised a closed switch circuit if IR due to $NO_2$ and $CO_2$ is detected (see FIG. 7B).
Figure 13:
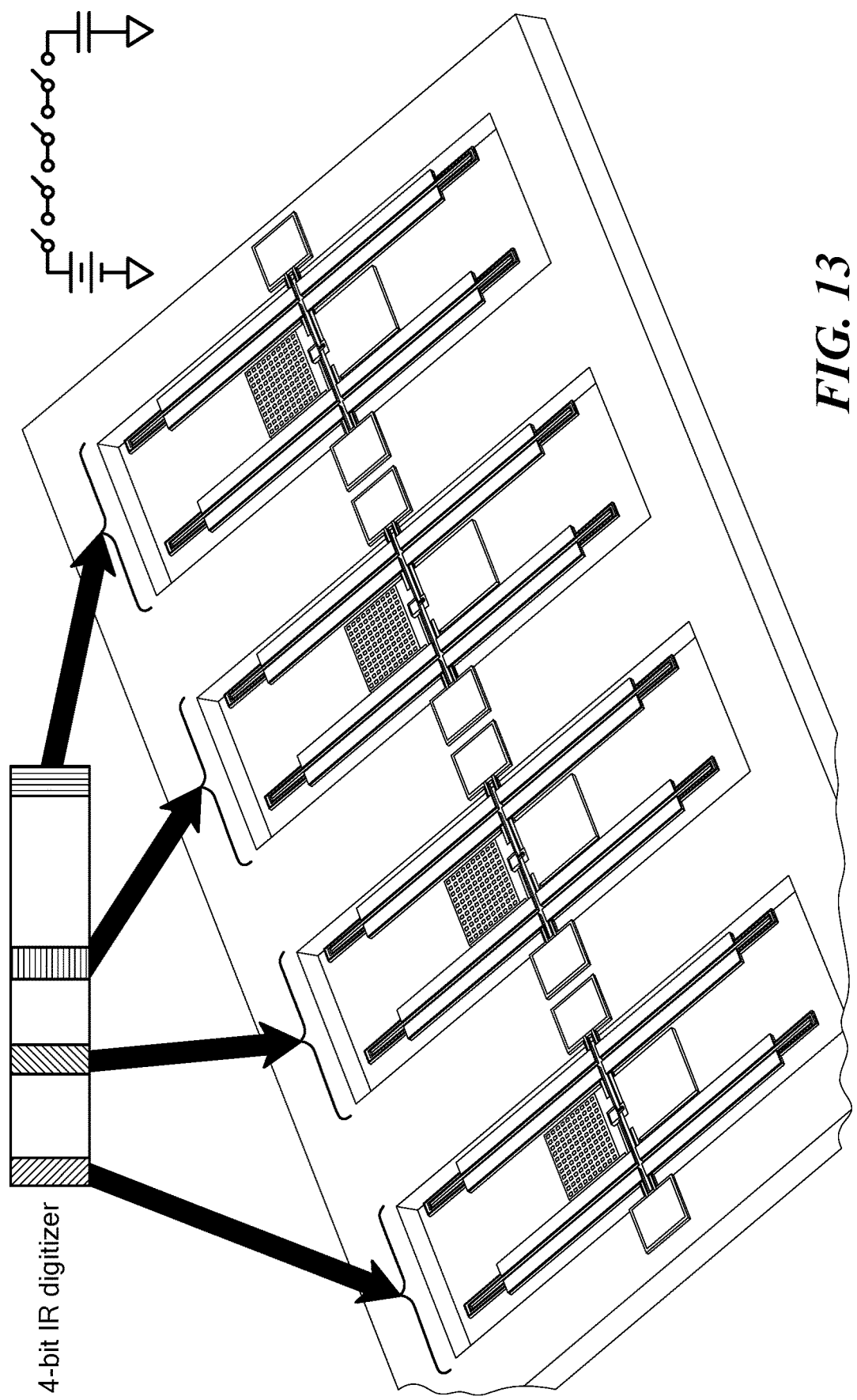
FIG. 13 is a schematic representation of a 4-bit IR digitizer containing four zero-power infrared sensors are placed in series. The plasmonic head of each of the sensors is tuned to a different range of the IR spectrum, providing 4-bit IR spectral resolution.

Multiple sensing modalities and detection thresholds can be implemented to fit specific application scenarios by changing the geometry and the materials of the micromechanical structure, which enables the fabrication of completely passive single-chip multi sensor solutions that produce OFF-to-ON state transitions in response to above-threshold variations in the intensity of several different parameters of the surrounding environment, for example, the appearance of failure indicators. The targeted environmental signal can be radiation emitted from, for example, a passing human, a passing vehicle, an equipment failure, or a fire. The targeted environmental signal can comprise a change in humidity or temperature. The electrical contacts within the micromechanical switches are mounted with a gap less than a micron, in the nanometer range, and actuators move the electrical contacts. The actuators within the switch that respond to an environmental signal can be enhanced by attachment to a head that selectively absorbs a targeted environmental signal or to a broadband head that absorbs a broader band of environmental signals. The actuators, the small gap between the electrical contacts, and the heads can be tuned for maximum sensitivity, but discretion between a targeted environmental signal and unwanted (untargeted) environmental signals can be accomplished by complex cantilever beams within the zero-power micromechanical switches. For example, each electrical contact can be attached to a complex cantilever beam that keeps the electrical contact motionless in response to untargeted environmental signals yet enables motion of the electrical contact only in response to a targeted environmental signal. Each of the cantilevered zero-power micromechanical switches can be positioned in series or parallel configurations to provide complex logic-sensing functions (FIG. 13) or to prevent false alarms activated by a fire (FIG. 7A).

Figure 7B:
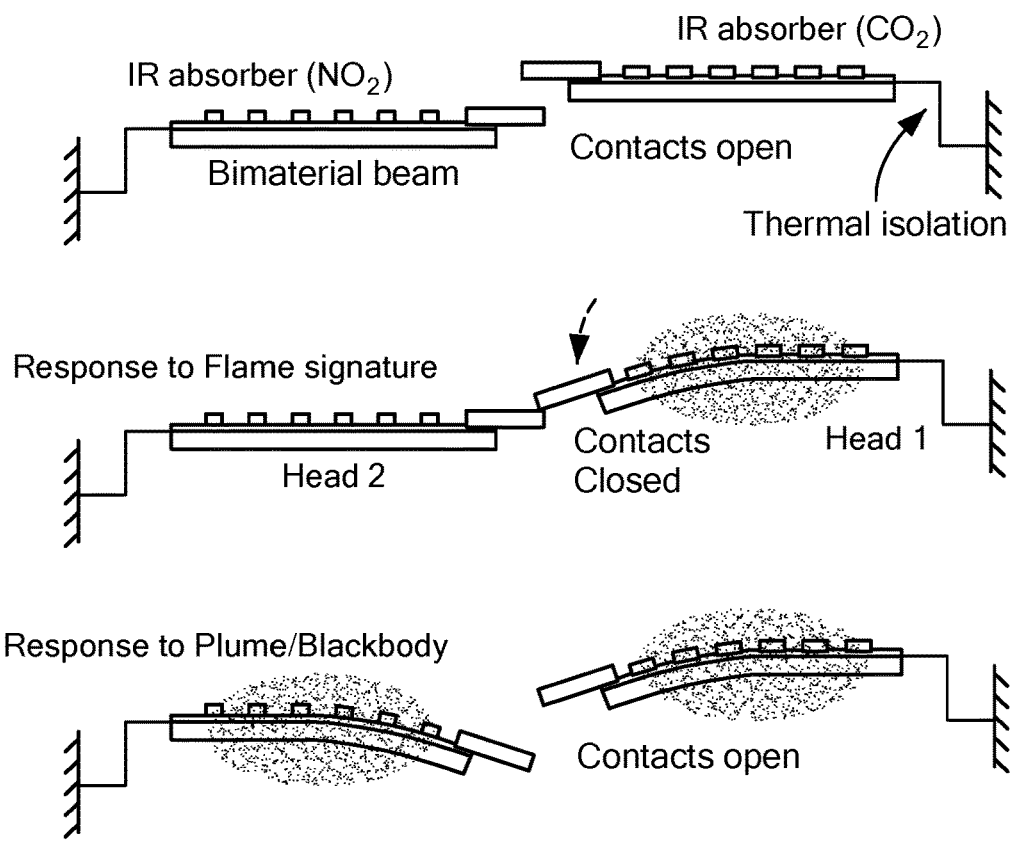
FIG. 7B illustrates the beam and contact configurations of a single zero power IR sensor that performs the logic operation depicted in FIG. 7A. The device has one plasmonic head responsive to IR emissions from $CO_2$ and a second plasmonic head responsive to IR emissions from $NO_2$. At the top panel of FIG. 7B, no IR has been absorbed. In the middle panel of FIG. 7B, IR from $CO_2$ emissions has been absorbed but not from $NO_2$, and the contacts have closed. In the bottom panel of FIG. 7B, IR has been absorbed from both $CO_2$ and $NO_2$, causing the contacts to remain open.
Figure 21:
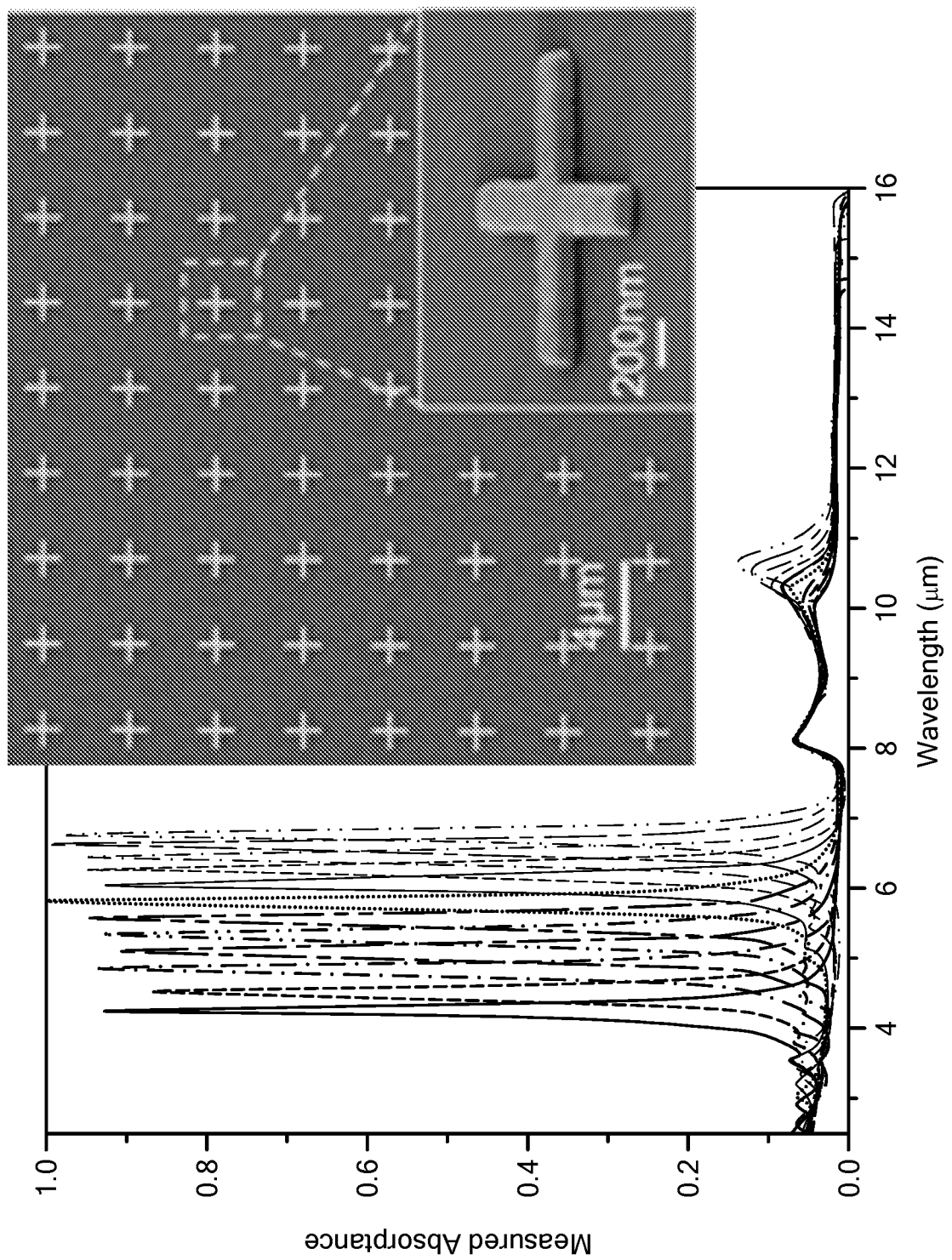
FIG. 21 shows some examples of wavelengths that can be specifically absorbed by suitably tuned plasmonic heads.

The present technology can utilize plasmonically-enhanced micromechanical photoswitches (MPs) that can provide zero-power sensing and monitoring systems. Plasmonic absorbing heads can be used in the MPs to absorb specific targeted wavelengths of infrared (IR) radiation. The IR radiation can be targeted to specific environmental stimuli by changing the properties of the plasmonic absorbing heads (FIG. 21). When targeted IR wavelengths are absorbed on the plasmonic IR sensor, the energy from the IR wavelengths can heat the plasmonic sensor which, in turn, conducts the heat to inner actuating beams, which cause physical movement of key micromechanical photoswitch components, for example, micro-electrical contacts. These motions can result in the mechanical closing of otherwise open circuit elements, thereby leading to signals that a target IR signature has been detected. The motions can result in the mechanical opening of otherwise closed circuit (or switch) elements, or the motions can result in an electrical contact moving to a position that prevents a closure, enabling logic functions in the micromechanical photoswitches (FIG. 7A and FIG. 7B).

Figure 4:
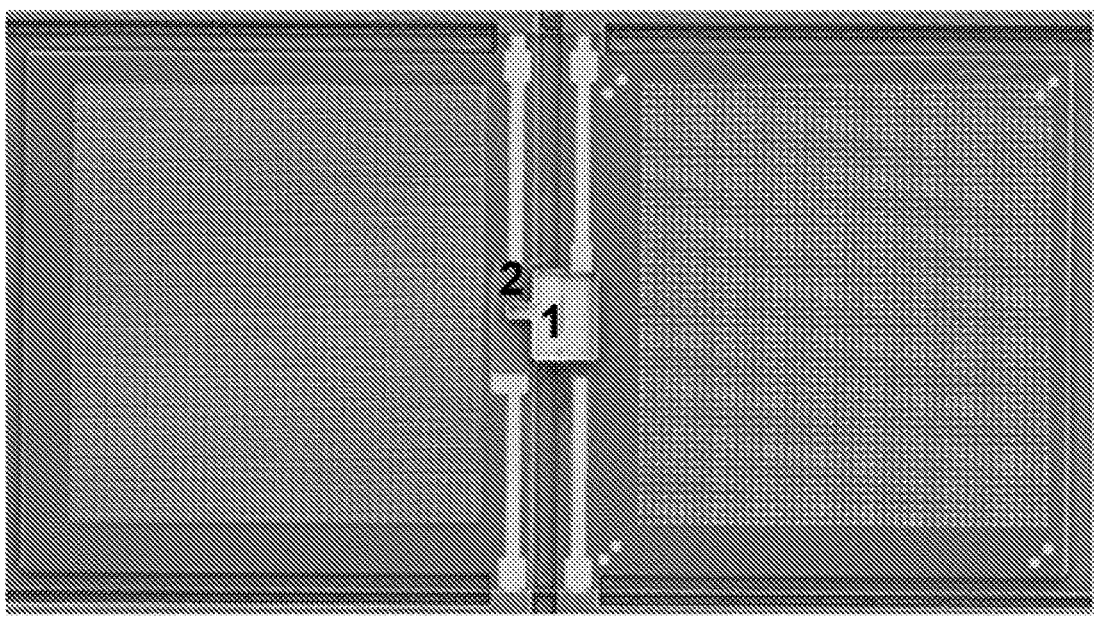
FIG. 4 shows an SEM image of two plasmonically-enhanced IR-sensing heads with attached electrical contacts 1 and 2.

An enlarged view of plasmonic absorbing heads is shown in the SEM image of FIG. 4. Electrical contacts 1 and 2 are shown affixed to two plasmonic absorbing heads, with the first electrical contact affixed to a first absorbing head, and the second electrical contact affixed to a second absorbing head.

The MPs are highly insensitive to non-targeted IR or environmental signals, thus preventing false alarms or false triggering of the MPs. Pairs of flexible resonant cantilever beams can be utilized on both sides of the absorbing heads to prevent movement of the heads and the electrical contacts in response to, for example, environmental (non-targeted) changes in temperature, non-targeted changes in IR, and physical movement.

In order to actuate without any battery power or external electrical power, the electrical contacts inside the MPs can be positioned about 1 nm to about 500 nm apart (less than a micron), enabling a small differential expansion in one or more components to open or close the electrical contacts. Thus, a small absorbance on the order of microwatts can actuate the MPs. With the electrical contacts positioned close, the contacts can be prevented from moving due to any untargeted environmental changes by utilizing the pairs of flexible resonant cantilevers comprising pairs of compensating and actuating beams (FIG. 1).

Figure 3A:
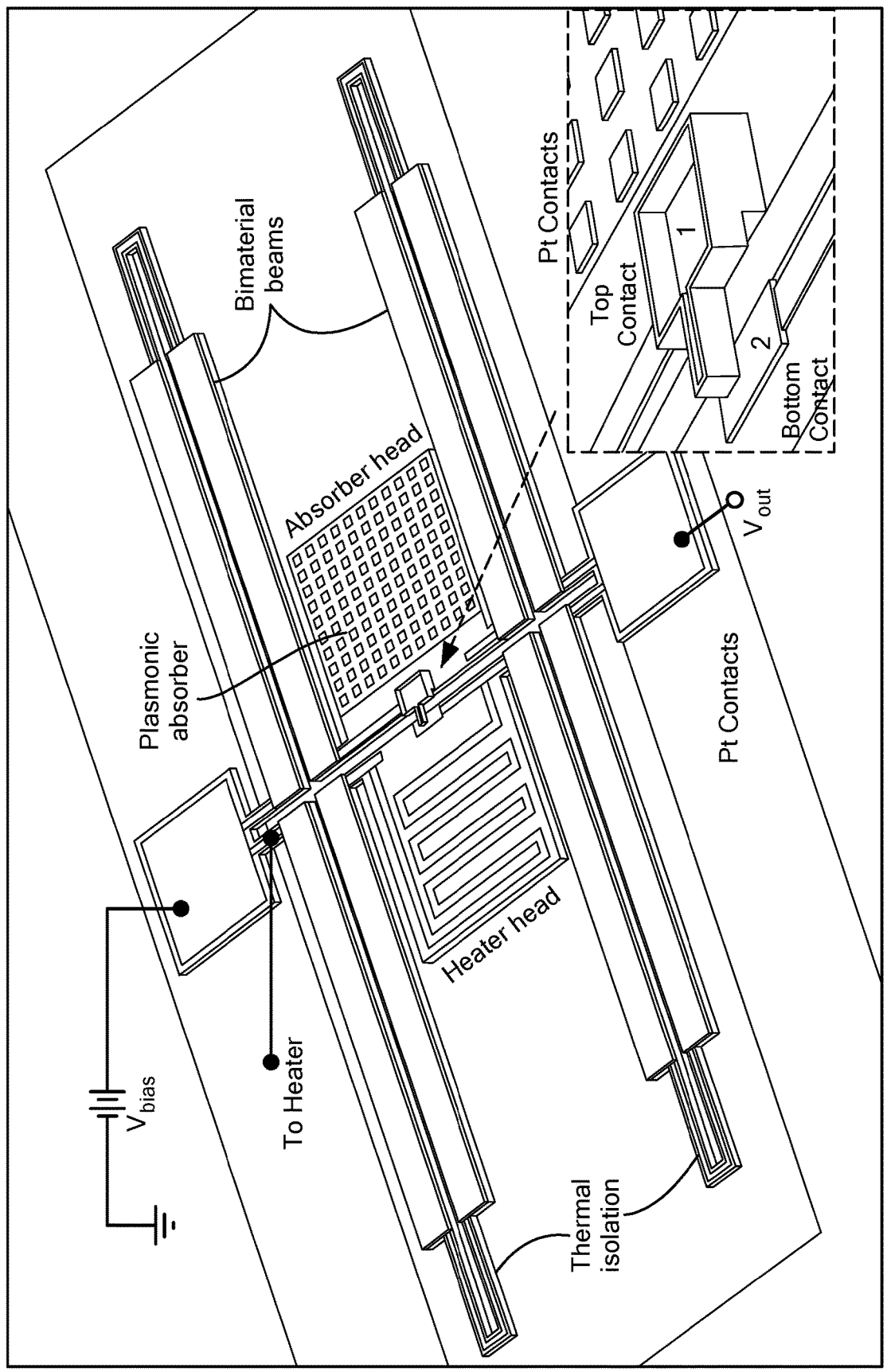
FIG. 3A shows an illustration of a zero-power infrared sensor having an electrical heater on one head and an IR plasmonic absorber on the other head. Electrical contacts 1 and 2 are shown in the open position in the inset.

The electrical contacts 1 and 2 shown in the lower right of FIG. 1 can be moved into a closed contact position or into an open contact position by differential movements of inner actuating beams relative to outer compensating beams. The enlarged 3D illustration of a zero-power infrared (ZIR) sensor shown in FIG. 1 has the two electrical contacts (1, 2) shown in the open position in the enlarged inset shown at the lower right of FIG. 1. The two electrical contacts are each mounted on a head positioned between a pair of resonant cantilevers. In FIG. 1, one of the plasmonic absorbing heads is shown as a broadband IR absorber, and an IR reflector is shown as the second head. As will be discussed in more detail, under the IR reflector, the second head can be configured with an in-built microheater for switch reset (FIG. 3A). The inner actuating beams connected to the heads can move in the Z-axis, moving the electrical contacts to open or closed position. Each cantilever is composed of a head, an inner pair of thermally sensitive bimaterial beams for actuation, and an outer pair of identical bimaterial beams for temperature and stress compensation. At the distal ends, the inner and outer beams can be connected by a thermal isolation link, which is free to move up or down in relation to the base plane.

Figure 2:
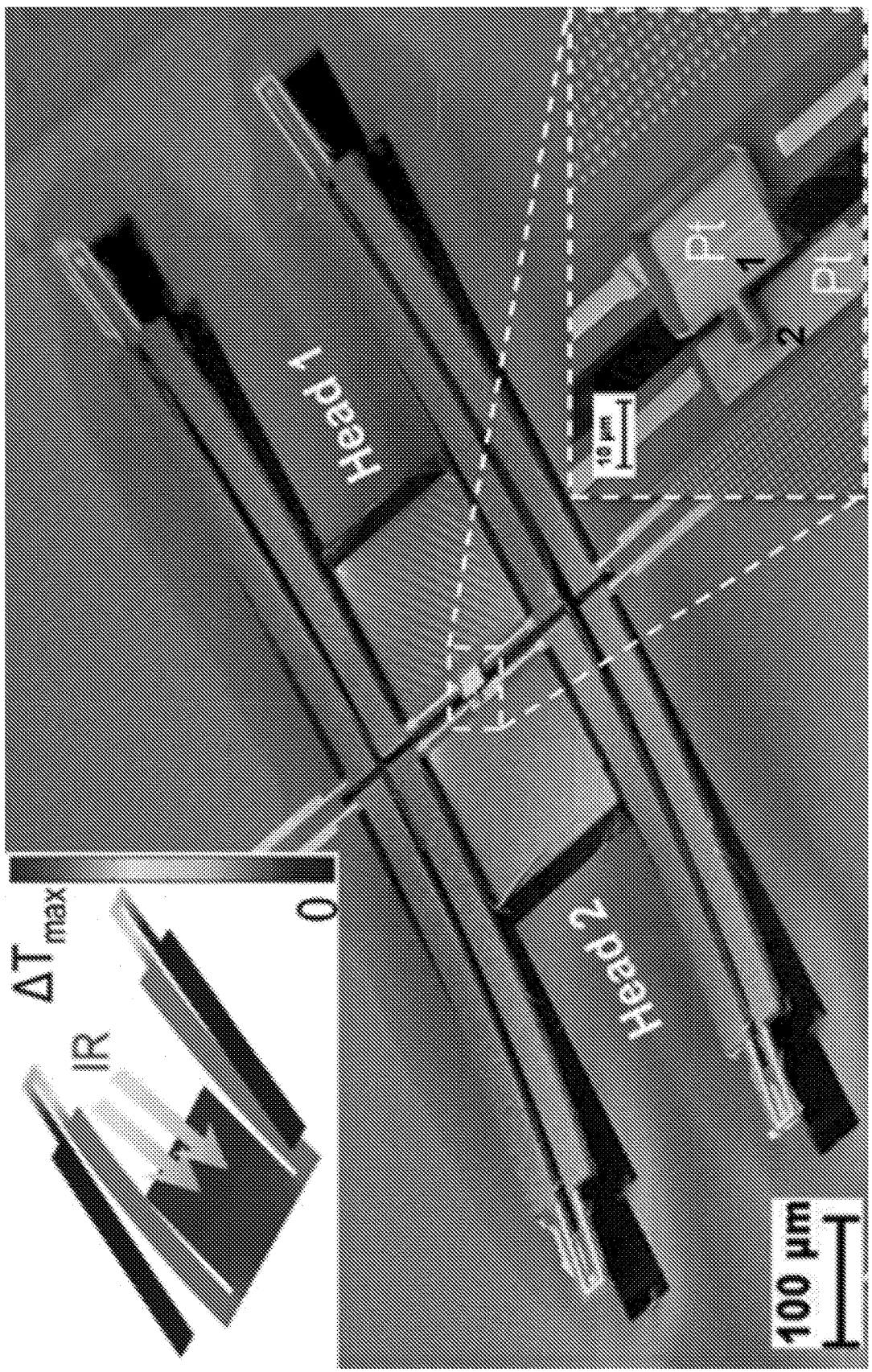
FIG. 2 shows a scanning electron microscope (SEM) image of a zero-power infrared sensor with two IR absorbing heads. The contact region, shown enlarged at bottom right, contains two platinum electrical contacts 1 and 2. The inset at the upper left illustrates how absorption of IR radiation at plasmonically-enhanced head 1 causes the inner actuating beams to bend downward relative to the outer compensating beams.

FIG. 2 shows a SEM image of a zero-power infrared (ZIR) sensor with two IR absorbing heads, with two platinum electrical contacts (1, 2, inset in lower right) shown at the gap between the two heads. The scale bar at lower left is 100 microns. The inset at the upper left of FIG. 2 illustrates absorption of IR radiation at plasmonically-enhanced head 1 causing inner actuating beams to bend downward relative to outer compensating beams. Electrical contact 1 overlaps electrical contact 2, so bending head 1 downwards would bring electrical contact 1 into contact with electrical contact 2 in this example. Distal from head 1 and head 2, the ends of the outer compensating beams and the ends of the inner actuating beams are shown bent upwards, out of the plane of the base, which is thin in the Z dimension and is shown surrounding the ZIR or MP. An outer compensating beam coupled with an inner actuating beam can form a pair of flexible resonant cantilever beams, and two pairs of flexible resonant cantilever beams can be attached to each head, a pair on each opposite side of a head. As temperature of the outer compensating beams and of the inner compensating beams changes, the distal ends can bend up or down out of the plane of the base, yet the head (and electrical contacts) remain stationary until a target signal is detected. A differential in temperature between the inner actuating beams and the outer compensating beams can cause a motion of the heads (and electrical contacts). The differential in temperature can be caused by IR absorbance at one of the plasmonically enhanced heads.

Figure 3B:
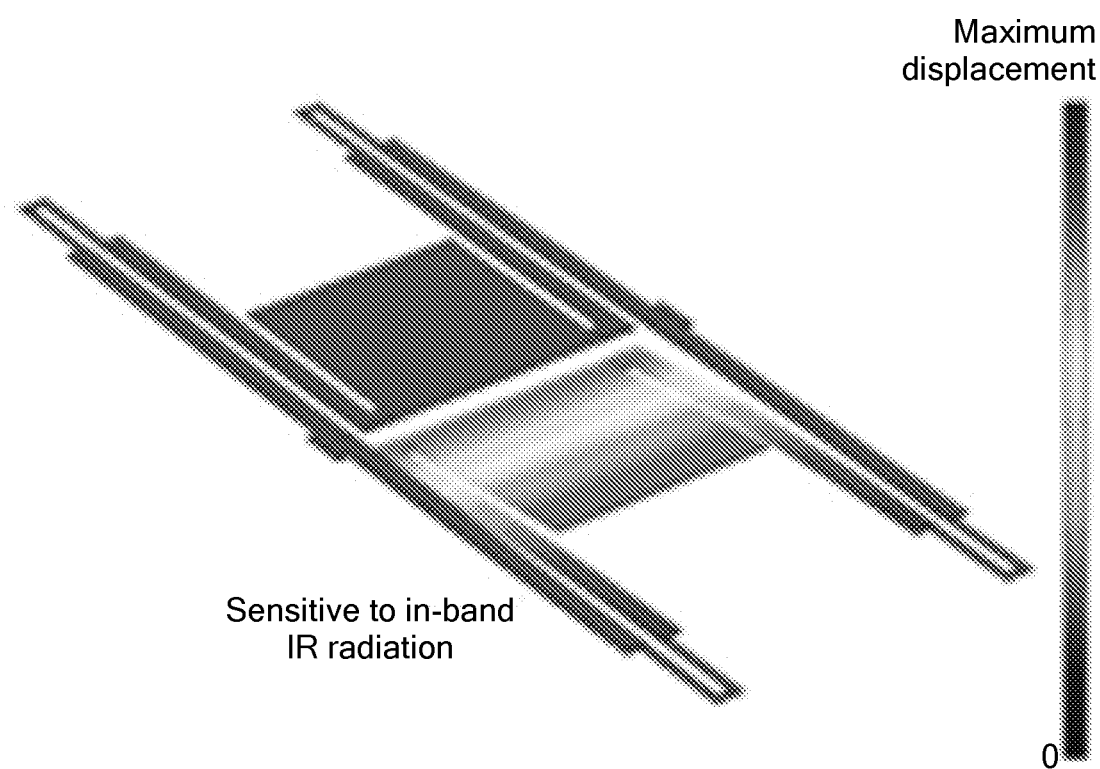
FIG. 3B illustrates a sensor in which absorption of IR radiation at a plasmonically-enhanced head causes the inner actuating beams to bend downward relative to the outer compensating beams.
Figure 3C:
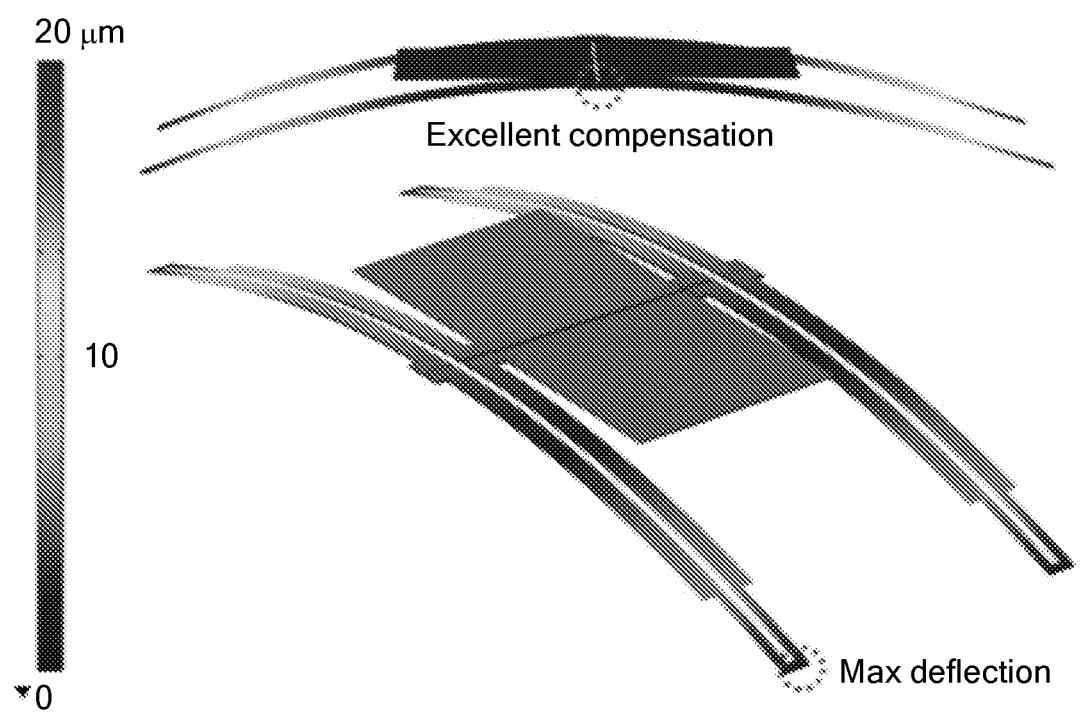
FIG. 3C illustrates temperature compensation by a sensor, in which the outer compensating beams and the inner actuating beams bend equally in response to temperature change, keeping the two heads aligned.

Heat can be conducted from a plasmonically enhanced head through the joint that mounts the plasmonically enhanced head to an inner actuating beam, the heat being conducted into the inner actuating beam. At the distal ends of the inner actuating beams and the outer compensating beams, a thermal isolation link (see FIG. 3A) prevents heat conduction between an inner actuating beam and an outer compensating beam, to maximize a temperature differential between an inner actuating beam and an outer compensating beam. For example, the thermal isolation links can comprise small tubular materials or can comprise the same material as the base or some of the same material as the inner actuating and outer compensating beams. FIG. 3B illustrates absorption of IR radiation at plasmonically-enhanced head 1 causing inner actuating beams to bend downward relative to outer compensating beams, and FIG. 3C illustrates temperature compensation, without showing the base, with the outer compensating beams and the inner actuating beams bending equally into an arc while keeping head 1 and head 2 aligned and stable. In FIG. 3C, the proximal ends of the pairs of flexible resonant cantilever beams are affixed to the heads, while the distal ends are shown in a maximum deflection.

Figure 20:
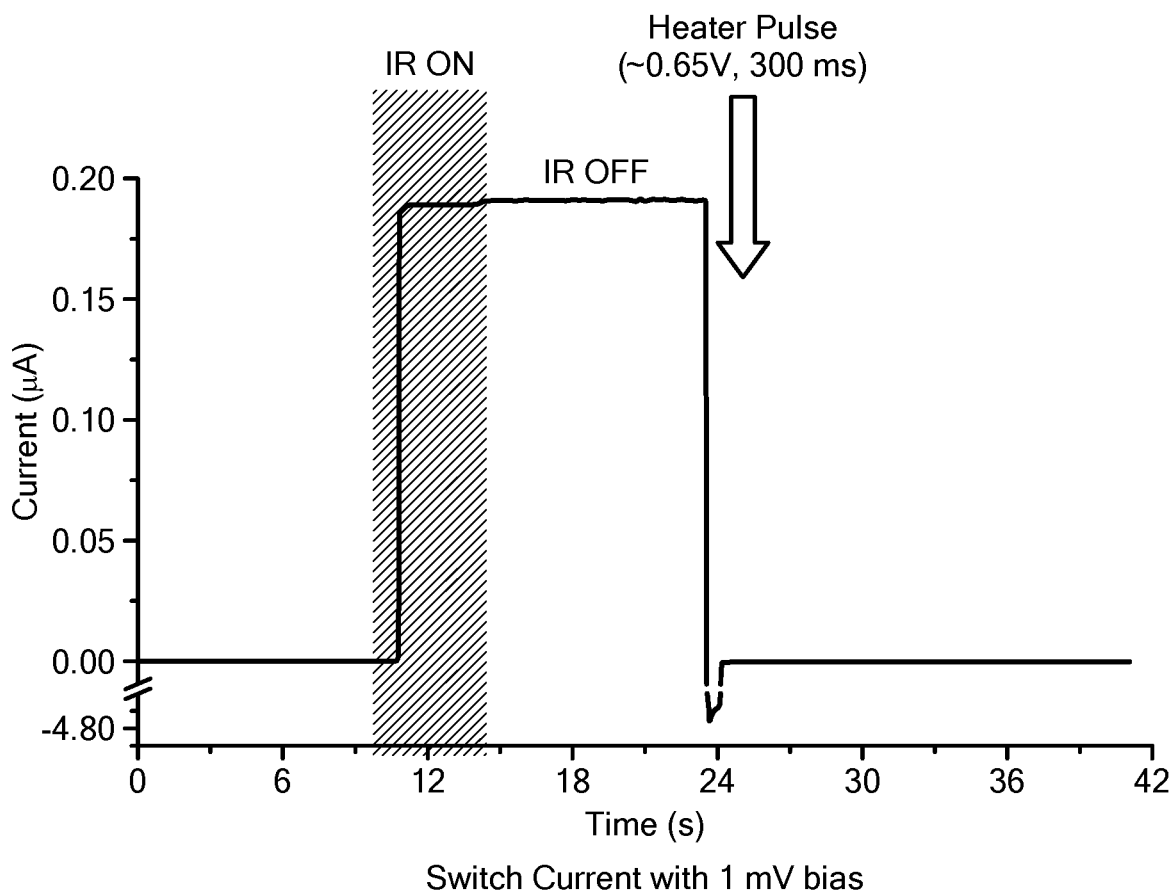
FIG. 20 shows a plot of current versus time for a latching test utilizing a manual heater reset of latching electrical contacts in a latching plasmonically-enhanced micromechanical photoswitch (PMP).

The example in FIG. 3A shows an enlarged 3D illustration of a zero-power infrared (ZIR) sensor comprising a heater head at the head 2 position and an IR plasmonic absorber head at the head 1 position. A heater head can be utilized to prevent closure of switch contacts or to bring the electrical contacts out of a contacted position. In some examples, the electrical contacts can latch together or adhere together after making electrical contact. A heater head can be utilized to unlatch the electrical contacts or to pull a pair of adhered electrical contacts apart (FIG. 6B). Latched or adhered electrical contacts can be utilized as a memory function such that once a targeted environmental signal dissipates, the electrical contacts can remain in a closed contact position until brought out of a closed contact position by a heater head or other functional component. A manual heater head was utilized to initially test the usage of a heater head, and FIG. 20 shows a plot of current versus time for a latching plasmonically-enhanced micromechanical photoswitch (PMP) test utilizing a manual heater reset of latching electrical contacts in a latching PMP.

The inner actuating beams and the outer compensating beams can be identical materials. A pair of flexible resonant cantilever beams can comprise an inner actuating beam and an outer compensating made of the same materials such that both react similarly to changes in temperature or other environmental conditions. In the lower left of FIG. 5, and enlarged view (SEM) of the isolation joint between an outer compensating beam and an inner actuating beam, along with layers of the beams. A substrate layer of the beams can comprise, for example, silicon dioxide, with a second material, shown as aluminum in FIG. 5, with a different thermal coefficient of expansion. A reflecting head (FIG. 1, FIG. 5) can be utilized to minimize temperature change in a second or first head.

The base of the MPs or the zero-power infrared (ZIR) sensors can be described as a base having a thin Z dimension and larger X/Y dimensions, the base defining a base plane in the X and Y axes.

Each of the first head and the second head is connecting the proximal ends of two first inner actuating beams. Each of the first inner actuating beams comprises a substrate with a first coefficient of expansion, a layer with a second coefficient of expansion, and a length. Each of the first two inner actuating beams is connected at the distal end to a parallel (or lengthwise) first outer compensating beam comprising the substrate with the first coefficient of expansion, the layer with the second coefficient of expansion, and the length. The proximal end of each of the parallel (or lengthwise) first outer compensating beams is affixed to the base by a flexible joint.

Each of the first two inner actuating beams is positioned about in the base plane, and each of the lengthwise first outer compensating beams can be parallel to and in the same plane as each of the first two inner actuating beams. The inner actuating beams positioned with the outer compensating beams form pairs, such that changes in environmental temperature cause the distal ends of the first two inner actuating beams and the distal ends of the parallel first outer compensating beams to deflect out of the base plane while forming an arc extending from the distal ends to the proximal ends. Thus, the first and second head remaining positioned in about the base plane, between the two proximal ends of two first inner actuating beams, and changes in environmental temperature (or other variables) do not cause the first head to change position relative to the base plane and relative to the second head.

Figure 5:
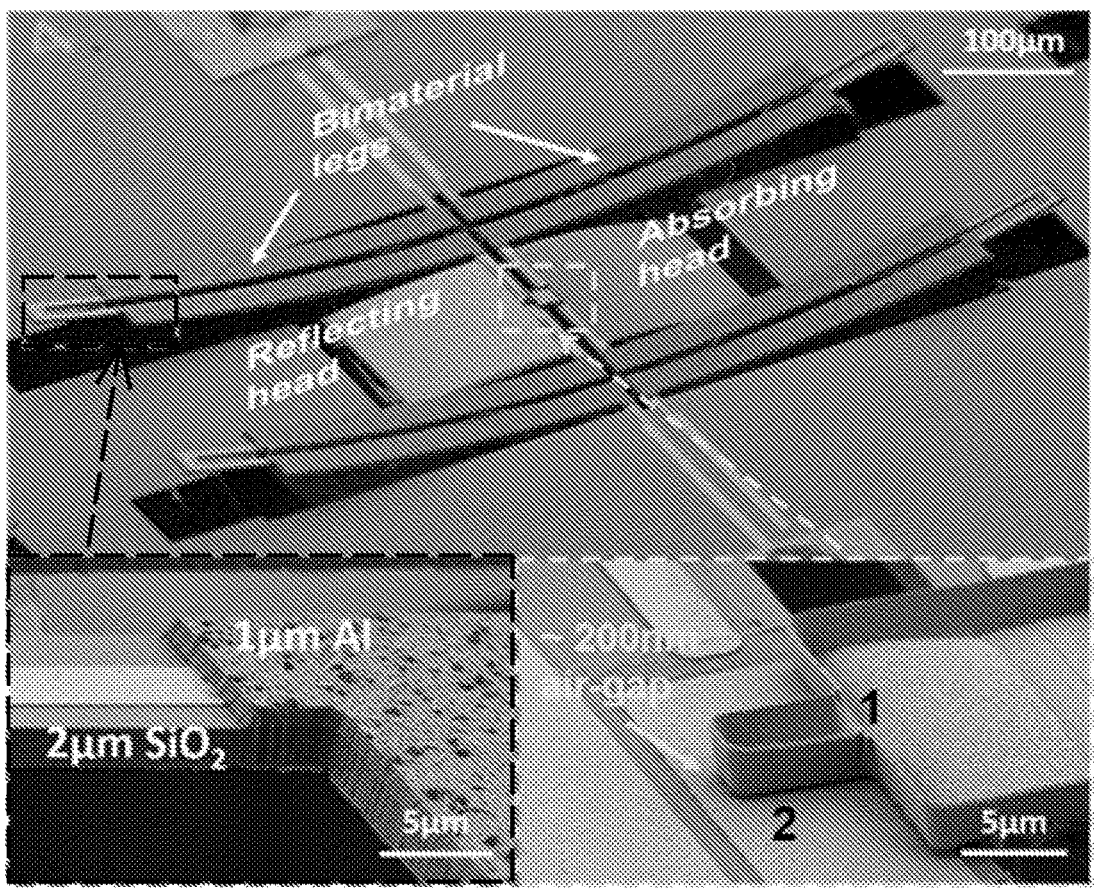
FIG. 5 shows an SEM image of a zero-power infrared sensor containing a reflecting head at and an IR plasmonic absorber head. The inset at lower left shows an enlarged view of a thermal isolation region. The inset at lower right shows the contact region having an air gap between the two contacts.

A head along with two pairs of flexible resonant cantilever beams and an electrical contact can be described as a cantilever. The present MP contains of a pair of symmetric released, resonant cantilevers, each composed of an absorbing (or null/reflecting/heating) head and an inner and outer pair of thermally sensitive bimaterial legs separated by a thermal isolation link as shown in FIG. 5. In place of a plasmonically-enhanced head, a broadband absorbing head can selectively convert impinging optical power in the LWIR regime to heat. A broadband absorbing head can comprise silicon dioxide with a reflector backing, for example, platinum. Upon the absorption of broadband LWIR radiation in the absorbing head, a large and fast increase of temperature in the corresponding inner pair of actuating beams can result in a downward displacement of the cantilever, bringing a high-stiffness platinum (Pt) tip into contact with the opposite terminal (FIG. 5, lower right). The switch can remain open until it absorbs LWIR radiance (e.g., from a human nearby) regardless of the change in ambient temperature, thanks to the symmetric design of the two cantilevers (FIG. 3C). The sub-micron air-gap maintained in standby translates directly into essentially zero leakage current and zero-standby power IR sensing.

Figure 18:
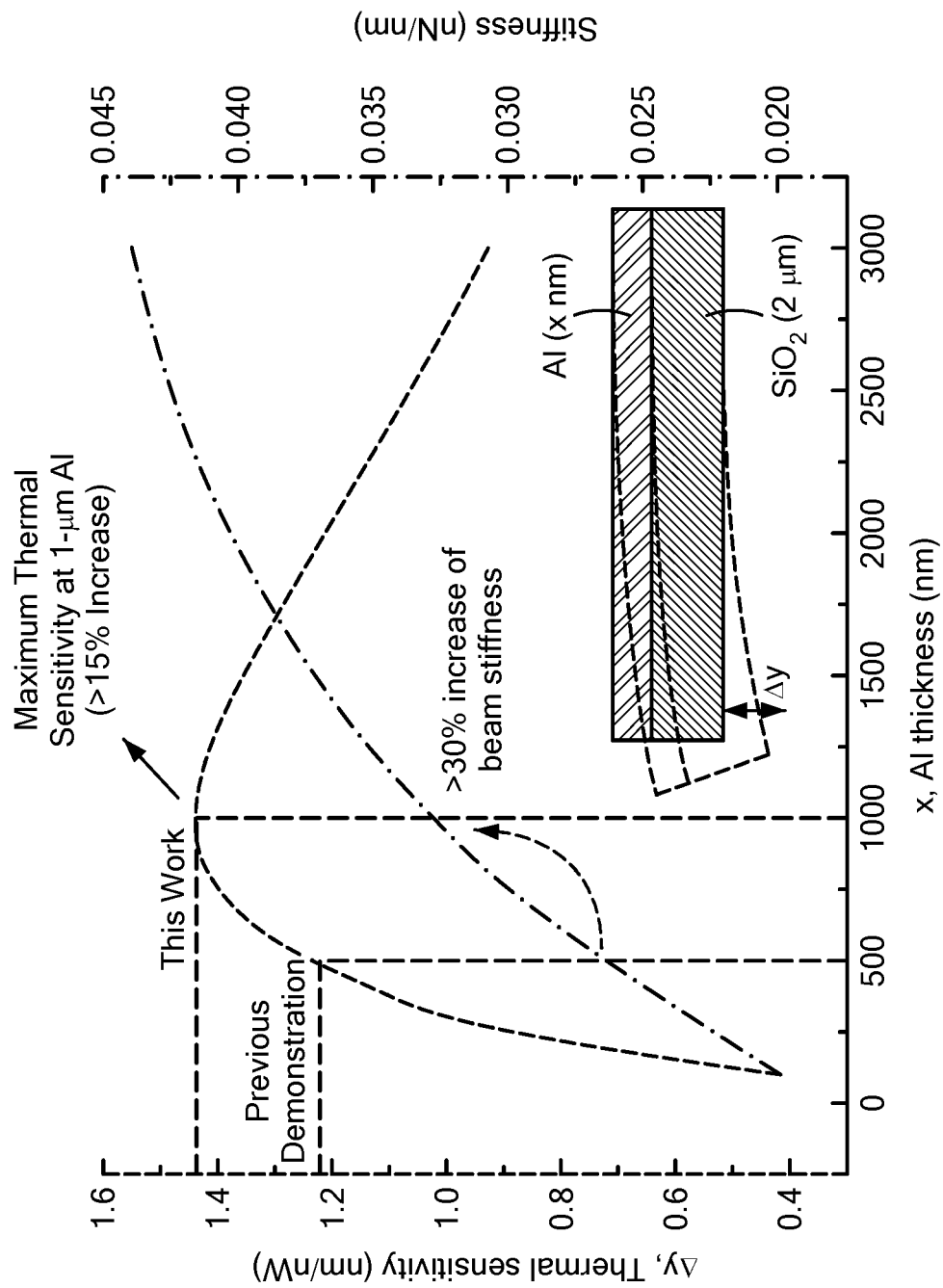
FIG. 18 shows a plot of thermal sensitivity (left y-axis) and beam stiffness (right y-axis) of the bimaterial legs of a zero power IR sensor as a function of the Al thickness for a fixed $SiO_2$ thickness of 2 μm. The vertical displacement, Δy, per unit absorbed IR power, is maximum for an Al thickness of 1 um.

The inner actuating beam and the outer compensating beam can be described as a pair of symmetric released cantilevers, each pair comprising an absorbing (or reflecting) head and an inner and outer pair of thermally sensitive bimaterial legs separated by a thermal isolation link as shown in FIG. 1. The bimaterial inner absorbing beams and outer compensating beams can comprise two or more materials with different coefficients of expansion or two or more materials with different reactivity towards humidity, radiation, heat, or other targeted environmental signals. As an example applied to thermal sensitivity, FIG. 18 shows a plot of thermal sensitivity (left y-axis) and beam stiffness (right y-axis) of the bimaterial legs (beams) as a function of the aluminum thickness for a fixed $SiO_2$ thickness of 2 μm. The vertical displacement, $\Delta y$, per unit absorbed IR power, is maximum for an Al thickness of 1 um.

Figure 9:
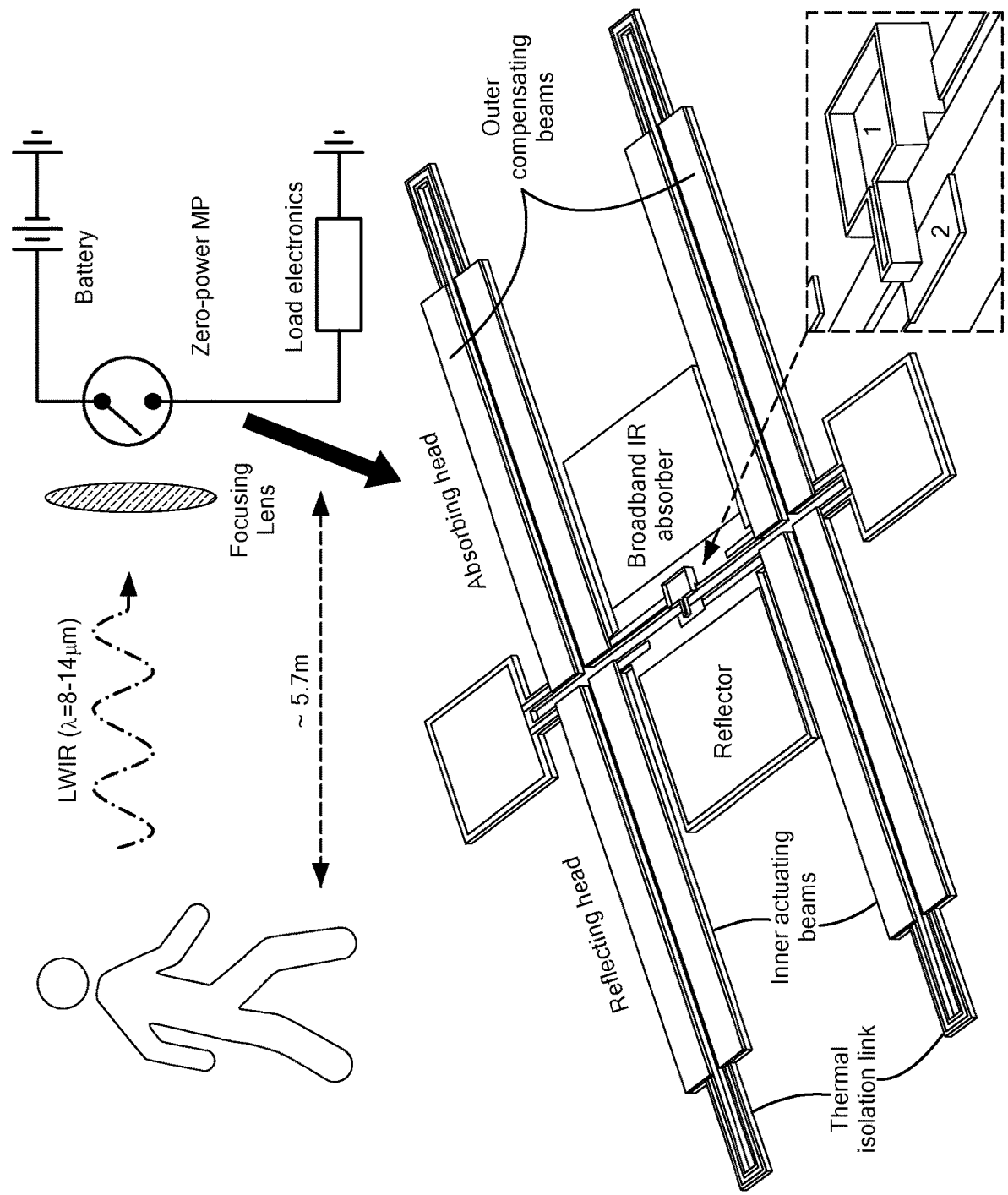
FIG. 9 illustrates a sensor using a focusing lens placed between LWIR (8-14 μm) emissions from a human and a zero-power infrared sensor. The focusing lens enables detection of a human up to about 5.7 meters.

By utilizing a broadband absorbing head as the first head, the micromechanical photoswitches (MPs) can be suitable for human detection with zero-power consumption while in standby. The MP can employ a highly-efficient broadband IR absorber ($\eta$~80%, $\lambda$=8-12 µm), spectrally matching with the IR radiance of a human body, for example, $SiO_2$ with Pt. An ultra-low detection threshold of ~140 nW has been experimentally demonstrated, and can be attributable to the high thermal sensitivity (~1.44 nm/nW) and stiffness (~0.033 nN/nm) of the optimized bimaterial actuating beams and the aggressively scaled nanoscale contact gap (<200 nm, FIG. 5) maintained by the built-in temperature and stress compensation mechanisms. Such low threshold enables, for example, human subject detection with a lens at a projected distance of 5.7 m (FIG. 9). Without a lens, distances up to about 0.75 m or 1 m can still be obtained.

Figure 19:
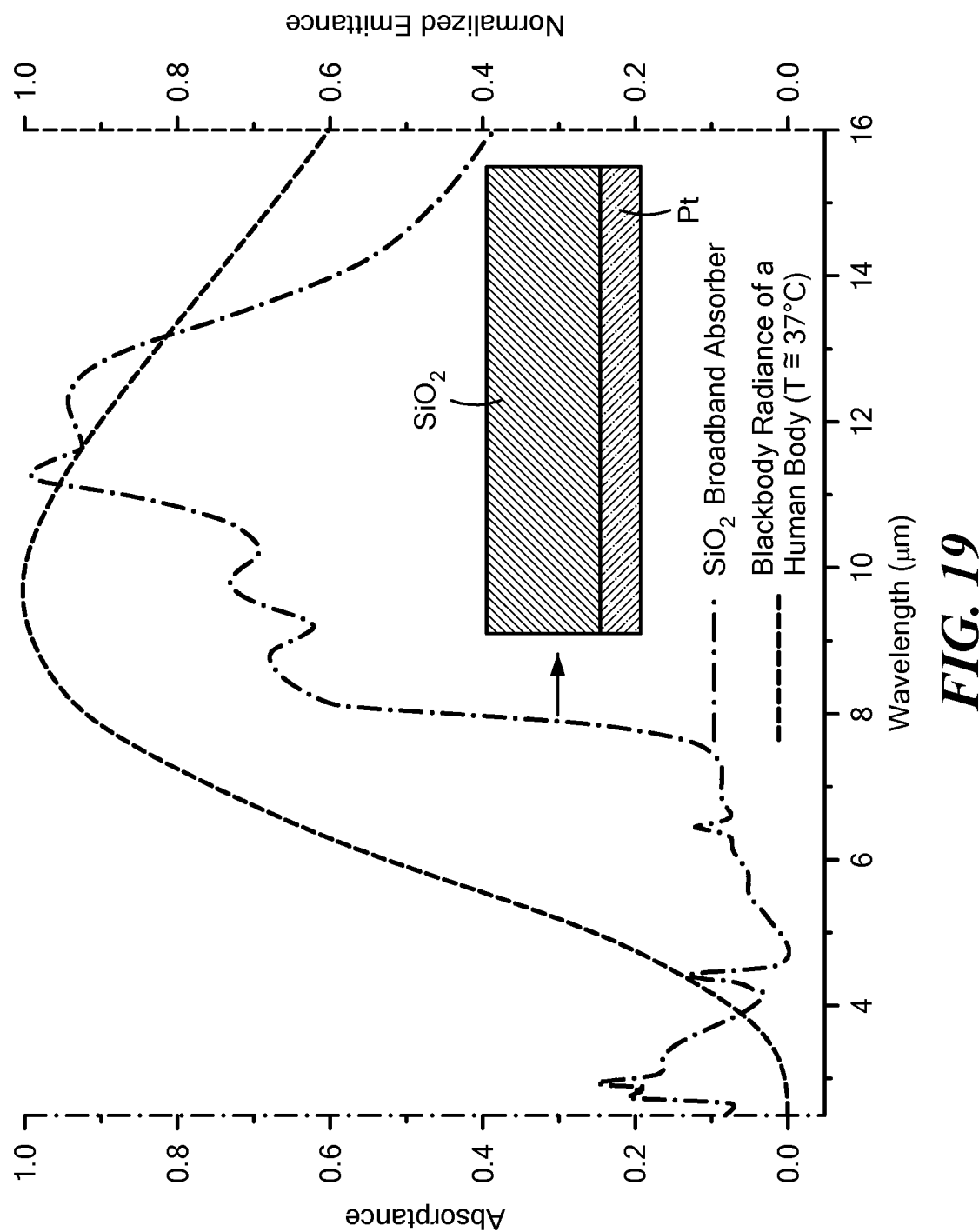
FIG. 19 shows the spectral response of the broadband $SiO_2$ absorber in LWIR (bottom curve with peaks at ~4.5 and ~6.5 μm, left y-axis) and the normalized blackbody emission (human) at 37° C. (top smoother curve, right y-axis). The inset shows the cross-section schematic of the broadband $SiO_2$ absorber with Pt layer.

FIG. 19 shows the spectral response of the broadband $SiO_2$ absorber in LWIR (bottom curve with peaks at ~4.5 and ~6.5 µm, left y-axis) and the normalized blackbody emission (human) at 37° C. (top smoother curve, right y-axis). The inset shows an example cross-section schematic of the broadband $SiO_2$ absorber with a Pt layer or reflector.

Figure 8:
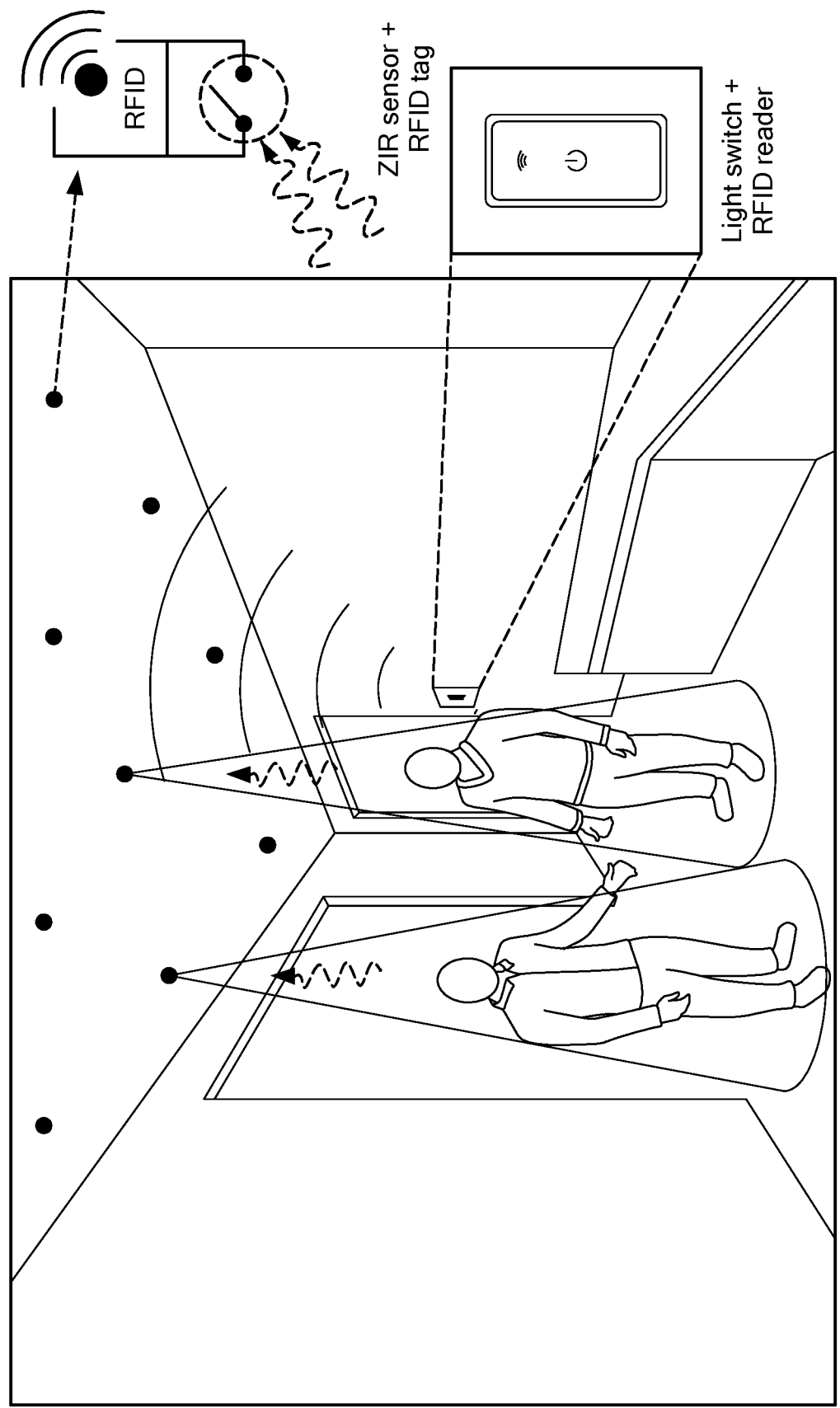
FIG. 8 shows a schematic illustration of a system using battery-free human-body-triggered infrared sensor tags for indoor occupancy sensing within a building.

For applications directed to human (or mammal) detection, the MPs have excellent sensitivity and can remain in the standby mode, without consuming any power, for many years. The MPs can be applied to human detection in a building (FIG. 8) to improve heating ventilation and air conditioning (HVAC) systems. It is known that HVAC systems do not necessarily need to heat, ventilate, or cool an unoccupied building, so deployment of the zero-power MPs in a building can be utilized to determine which portions of the building are occupied, and the HVAC system can be operated with greatest efficiency by directing heating, ventilation, or cooling to the areas of the building that are occupied. In FIG. 8, MPs are illustrated above human subjects, the MPs shown as small circles in the ceiling of a building. Each of the MPs can be zero-power and connected to a radio-frequency identification (RFID) tag such that closure of the electrical contacts within a MP will close a circuit connected to a RFID tag. An RFID reader can be, for example, configured in a light switch as shown in FIG. 8.

When configured to detect humans, the MPs can combine IR-based true presence sensing technology with well-developed RFID technology to realize high-accuracy, low-power and low-cost indoor people counting. The approach relies on the zero-power infrared (ZIR) digitizing sensor technology. The ZIR device can selectively harvest the energy contained in the specific IR signal of interest (i.e. the IR radiation from human body) and use it to mechanically create a conducting channel between two electrical contacts, without the need of any additional power source. Differently from PIR technology, ZIR sensors produce a binary signal directly corresponding to the presence and absence of the triggering IR radiation, and do not require any active electronics for signal conditioning. The capability of passively digitizing the presence of a specific IR radiation makes this technology work for integration with a RFID-based wireless readout: the electrical conductance of the ZIR sensor increases by 12 orders of magnitude (from an open to a closed circuit with a practically infinite subthreshold slope) when a human body is in the field of view, which effectively generates a large backscatter (i.e. a large signal reflected back towards the source) upon interrogation from the reader. Such IR-based presence sensing and wireless readout also enable people counting function when an array of sensor tags is deployed on the ceiling. Estimating the total number of people inside a room can be as simple as counting the number of activated ZIR sensors when they are densely arranged on the ceiling of a room or placed on top of each cubicles/desk in an office. The virtually zero computational requirement of this approach greatly facilitates the adoption of commercially available RFID readers with compact size and therefore the integration with existing HVAC controllers. Therefore, the occupancy sensing technology based on ZIR sensors and RFID tags represents a truly user-transparent, privacy-preserving and universally adaptive solution for people counting in commercial buildings and it has great potential to be commercialized once fully developed.

Figure 16:
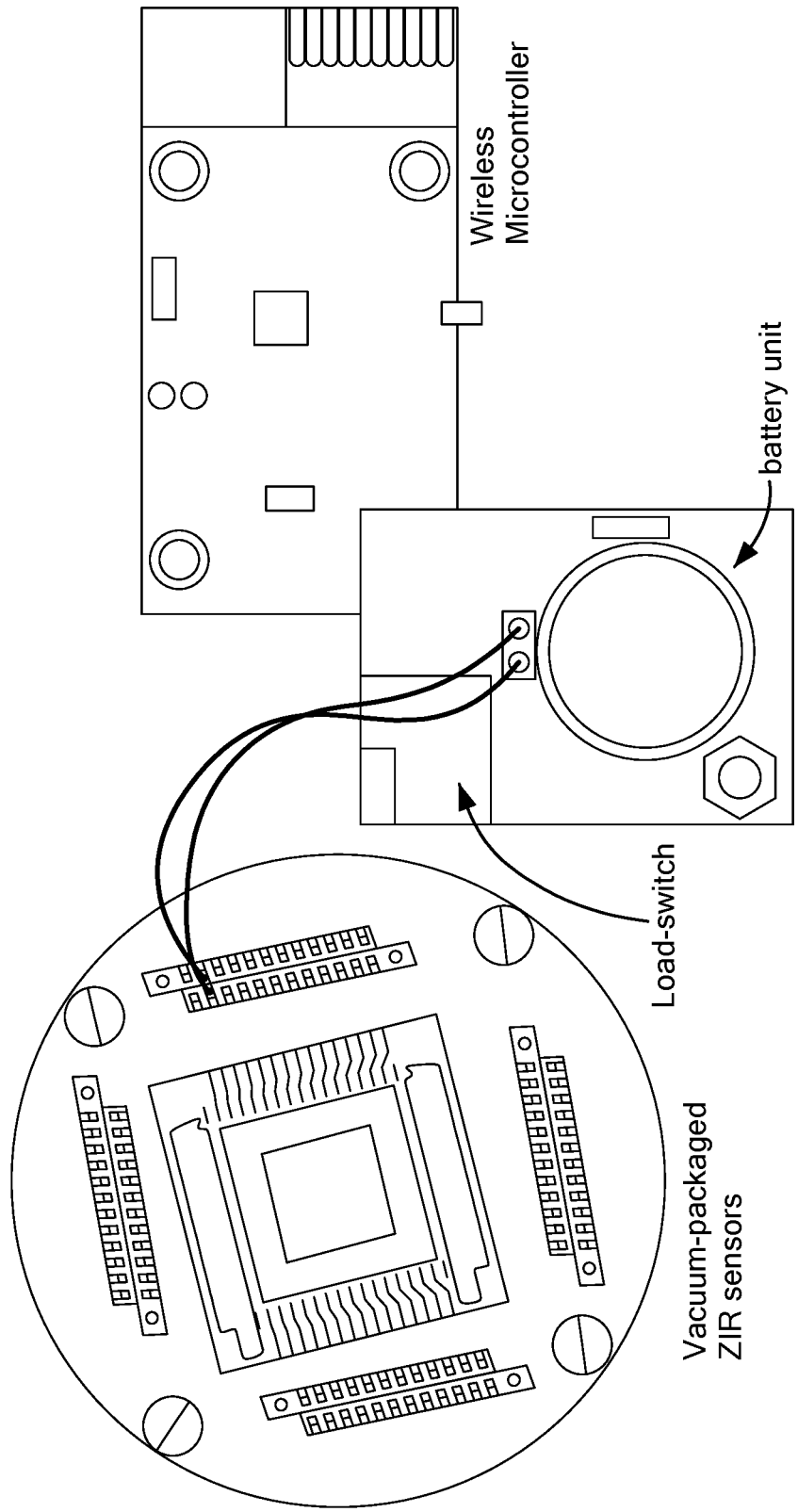
FIG. 16 shows a zero power IR sensor system. The sensors are placed inside a vacuum package. A battery unit is illustrated at center with a load-switch. A wireless transmitter is illustrated at right.

The present technology can provide a fully packaged battery-free wireless presence sensor node capable of reliably detecting human body (detection probability 95%) from 1 meter above the head and communicating with a RFID reader over 10 meters away in a typical indoor environment. Bodies of humans and other animal subjects emit IR radiation mainly at 8 to 14 µm. In order to discriminate the human body radiation from the background (i.e. radiation from the floor), the sensor is configured to capture the difference between the two emission spectra, which peaks at ~8 µm with a wide spread from 6 to 12 µm. To effectively collect most of the IR energy, broadband long-wavelength IR absorbers are used, which contain a 2-µm $SiO_2$ slab backed by a metal reflector. A ZIR sensor allows an ultra-low IR detection threshold of ~140 nW capable of detecting human body at 5.7 m distance with a focusing lens (e.g., a 25 mm diameter lens can be used, FIG. 9). When detecting a human body from above, the available IR power will inevitably be smaller due to the reduced portion of exposed skin within the sensor field of view. Therefore, device design is optimized to scale down the detection threshold to ~100 nW. The efficiency of the bimaterial thermal actuators can be optimized by varying the geometry and employing metals or alloys with high thermal expansion coefficients (such as zinc, which is characterized by 30% higher expansion coefficient and 50% larger Young's modulus than aluminum). The thermal resistance of the structure can be increased by using hollow structures for the thermal isolation links while maintaining a relatively high stiffness of the entire folded structure. Another important aspect of the ZIR sensor is its high reliability. The IR switches have a maximum lifetime higher than one million cycles based on the numerous reliability studies reported for micromechanical switches with the same contact material. Assuming the ZIR sensors switch 100 times per day, a lifetime of one million cycles is sufficient for the devices to operate—30 years. Thanks to the built-in temperature compensation mechanism and the spectrally selective IR absorption of the device, the demonstrated prototypes are characterized by an extremely low false alarm rate. Vacuum-packaged ZIR sensors with UHF passive RFID tags can be used for wireless readout (FIG. 16).

Micromechanical photoswitches (MPs) can exploit IR signature emissions from targets of interests to form an electrical channel between the device terminals via thermomechanical coupling. An MP can be placed in between a battery and active electronics, such as shown in FIG. 16, to eliminate power consumption when there is no event of interest. It is only when the absorbed IR power exceeds the designed threshold level (e.g., ~500 nW) that the mechanical switch is closed to supply power to the active electronics. In the present device, a 2-µm silicon dioxide ($SiO_2$) slab backed by a metal reflector is employed as the IR absorbing element in an optimized micromechanical photoswitch for ultra-low threshold IR detection in the LWIR range (FIG. 18). Replacing the plasmonic absorber used in previous devices for narrowband mid-IR absorption, this broadband dielectric absorber exploits the intrinsic absorption of the SiO$_2$ layer. The intrinsically high loss of SiO$_2$ slab due to vibrational modes of longitudinal-optical (LO) phonons leads to a consistently high broadband absorption in LWIR specifically suitable for human detection applications [9].

To improve the detection threshold, two approaches were adopted. First, the thermal sensitivity of the bimaterial actuating beams is increased by optimizing thickness ratio of aluminum (Al) and SiO$_2$. Different from previous devices, the present device employs 1-µm thick Al on a 2-µm thick SiO$_2$ material as shown in the bottom left inset of FIG. 2. This ratio in fact corresponds to the maximum thermal sensitivity (1.44 nm/nW, corresponding to more than 15% increase compared to previous demonstrations) for a fixed 2-µm SiO$_2$ layer (FIG. 3).

The contact-gap is scaled down to reduce the actuation threshold. The smaller contact-gap was defined by the thickness of amorphous silicon layer, which serves as a sacrificial layer between the Pt contact and the electrical terminal on the opposite head [4]. It is worth noting that, although the contact gap can be in principle arbitrarily scaled within fabrication limits, a small gap yields an insufficient restoring force, causing stiction of the contacts. In the present device, however, stiction-free contacts are achieved, despite the aggressive gap scaling, thanks to the optimization of the bimaterial beams, which not only increased the thermal sensitivity but also the overall stiffness of the folded beam structure (~0.033 nN/nm). Compared to the previous demonstration of narrowband MPs in [4], the optimized bimaterial design led to more than 15% increase in maximum thermal sensitivity and at the same time, the beam stiffness increased by more than 30% (FIG. 4).

If the MPs are utilized outdoors, near vehicles, or near other sources of IR radiation, vehicle detection can be utilized to prevent false alarms. FIG. 7A illustrates the wavelengths (µm) and intensities of NO$_2$ and CO$_2$ infrared emissions from a flame in the MWIR region (3-8 µm) and infrared from an exhaust plume at about 2.75 µm. An electrical circuit is illustrated at top. The circuit illustrates the logic behind designing a switch that would not comprised a closed switch circuit if IR due to NO$_2$ and CO$_2$ is detected (see FIG. 7B).

FIG. 7B illustrates a zero-power infrared (ZIR) sensor with plasmonic head 1 responsive to IR emissions from CO$_2$ and plasmonic head 2 responsive to IR emissions from NO$_2$. At the top panel of FIG. 7B, no IR has yet been absorbed. In the middle panel of FIG. 7B, head 1 has absorbed IR from CO$_2$ emissions (see FIG. 7A), and the contacts have closed for illustration. In the bottom panel of FIG. 7B, head 2 has absorbed IR from NO$_2$ emissions, causing lower electrical contact 2 to move downward, and the contacts are open when IR emissions from both CO$_2$ and NO$_2$ are absorbed (flame). Thus, the sensor does not close the contacts due to emissions from flame or from NO$_2$ and CO$_2$ emissions.

Engines that burn gasoline or diesel fuels emit specific compounds in their exhaust gases. Among these compounds are CO$_2$, CO, H$_2$O, various oxides of nitrogen and sulfur (NOx and SOx, respectively), and hydrocarbons such as methane. As a result, the infrared emission spectra of the heated tailpipe gases coming out of vehicles such as trucks, cars or aircraft can by themselves act as a signature specific to a vehicle type. By tuning absorption as illustrated in FIG. 7A and FIG. 7B, the MPs can be utilized to detect specific types of vehicles with high sensitivity.

Figure 14:
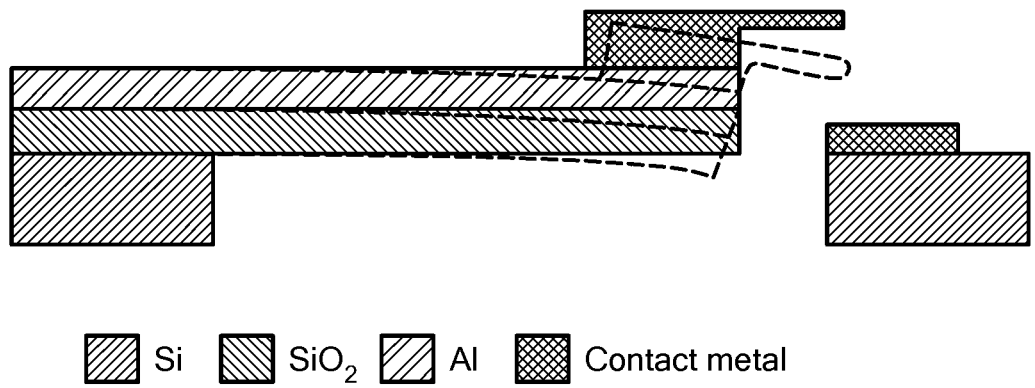
FIG. 14 illustrates a temperature sensor wherein aluminum, which has a higher coefficient of expansion than $SiO_2$, bends electrical contacts together as temperature rises.
Figure 15:
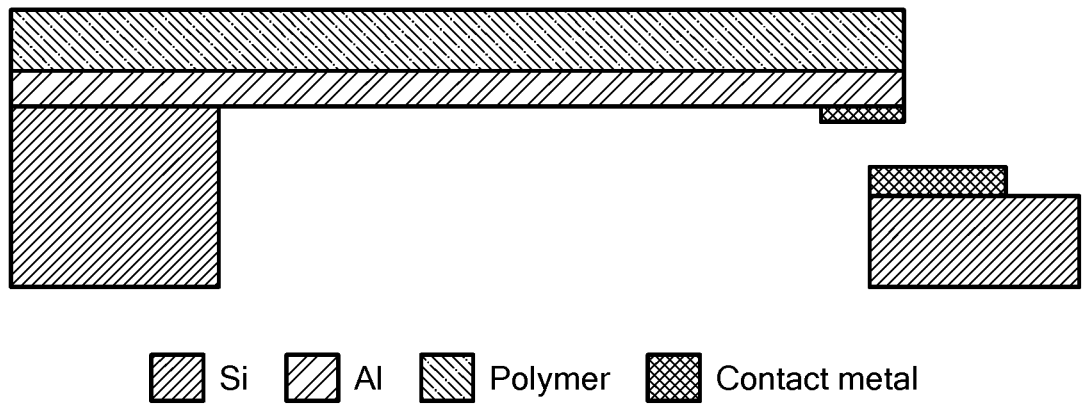
FIG. 15 illustrates a humidity sensor wherein a polymer, which expands as humidity rises, is on top of an aluminum layer; as the polymer expands, the contact metal moves to the closed contact position.

The MPs can be designed to detect targeted humidity conditions instead of targeted IR conditions, or both. FIG. 15 illustrates an inner actuating beam (or outer compensating beam) that has a substrate layer comprising aluminum and a second material with a second coefficient of expansion to humidity, the second material being a polymer that expands and contracts in correlation to increasing and decreasing humidity. The second material can comprise polymers of a plasma-polymerized methacrylonitrile. The present zero-power humidity digitizing sensor consists of a moisture-actuated micromechanical relay (FIG. 15). The cantilever bends in response to an increase in the humidity level, due the moisture induced expansion in the polymer thin film [5]. Packaging solutions similar to the ones used for MEMS microphones can be used to provide mechanical protection to the sensors while exposing it to the surrounding atmosphere. Moisture induced bending of a 350 µm long Plasma-Polymerized Methacrylonitrile (PP-MAN) beam has been demonstrated showing ~4 µm displacement in response to a relative humidity change of 1% [5]. The MPs can be designed to target changes in temperature within a range or ranges. FIG. 14 illustrates an inner actuating beam (or outer compensating beam) that has a substrate layer comprising silicon dioxide and a second material with a second thermal coefficient of expansion comprising aluminum. In the examples illustrated in FIG. 14 and FIG. 15, the first head and the second head do not require a plasmonically-enhanced absorber (FIG. 4) and can comprise a reflector or a neutral mount for an electrical contact. Temperature sensor: The zero-power temperature digitizing sensor consists of a temperature-triggered micromechanical switch (FIG. 2c) based on the technology platform developed by the Rinaldi group. The temperature sensor can be sealed in a hermetic package thermally connected to the surrounding environment. Thermally-sensitive bimaterial beams with a sensitivity of 500 nm/° C. were demonstrated, which is sufficient for the scope of this project: the critical temperature of a transformer indicating impending failure (~200° C.) would induce a vertical displacement of the cantilever head sufficient to close the switch contacts.

By utilizing a combination of, for example, humidity, temperature, and IR sensing, complex monitoring of equipment can be accomplished in far away or hard to reach places.

Figure 17:
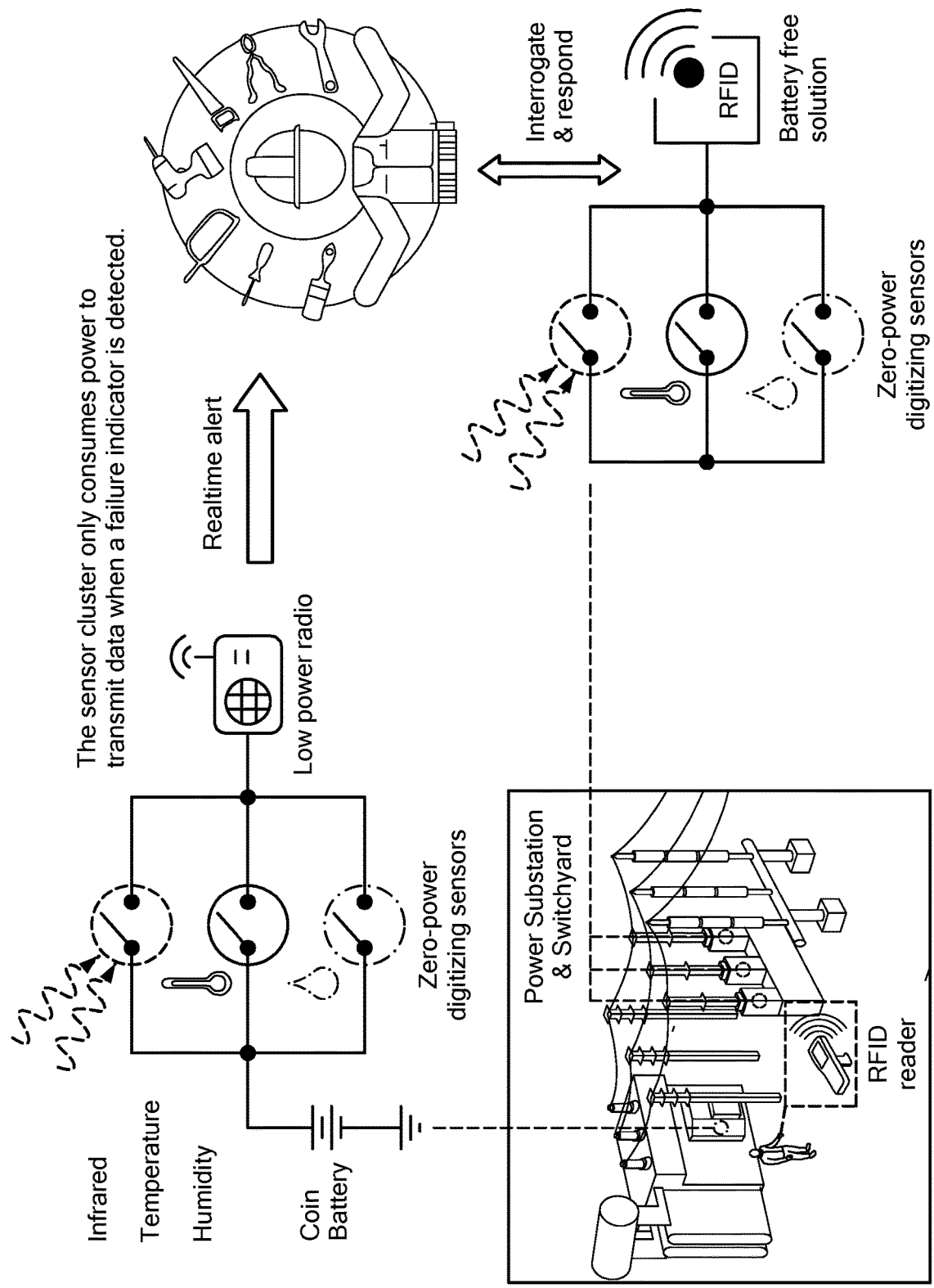
FIG. 17 shows a schematic illustration of a battery-free system for (circuit at right) for power substation and switchyard monitoring utilizing infrared sensor tags, temperature sensor tags, and humidity sensor tags. At the top left, the zero-power digitizing sensors (IR, temperature, and humidity) are illustrated with a low power radio and a battery, with the radio only consuming power when any one of the target IR, temperature, and humidity conditions is met.

FIG. 17 illustrates monitoring of a power station or a power distribution station. Battery-less (FIG. 17, right) power substation and switchyard monitoring utilizing infrared sensor tags, temperature sensor tags, and humidity sensor tags. At the top left of FIG. 17, zero-power digitizing sensors (IR, temperature, and humidity) are illustrated with a low power radio and a coin battery, with the radio only consuming power when the target IR, temperature, and humidity conditions are met.

The present technology includes a single-chip zero-power sensor cluster capable of responding to variations in the intensity of infrared radiation, temperature and humidity above alarm thresholds, which are the three major contributing causes of failure in an electrical grid (over 50% of grid failures) [1]. Such a single chip, zero-power digitizing sensor suite can be used to implement: (1) A zero-standby power battery-powered wireless sensor, with >10 year lifetime, that broadcasts real time alert wireless signals in response to the environmental signal induced OFF-to-ON state transitions of the switches (i.e. upon detection of a signal intensities above the alarming thresholds). In this configuration, the switches separate the system battery from a low power wireless radio transmitter (FIG. 1). When the switches are in the OFF state (i.e. failure indicator intensity levels below alarm thresholds) the battery is completely disconnected from the wireless transmitter (the switch contacts are physically separated by an air gap) resulting into a zero-leakage current (i.e. zero-standby power consumption, differently from any existing solid-state sensors). When the intensities of the monitored environmental signals equal or exceed the predetermined alarm thresholds the micromechanical relays are exposed to actuation forces sufficient to mechanically close the device electrical contacts and create a low-resistance electrical path between the battery and the radio transmitter, which triggers the transmission of a RF wireless alert signal. Therefore, the sensor consumes power to transmit data only when useful information is presents (i.e. appearance of a failure indicator) without wasting any energy when the monitored equipment is in good health. Thanks to the complete elimination of the standby power consumption, this approach results in the implementation of "deploy-and-forget" wireless sensors capable of revealing 1000s of failure events without ever replacing the battery. (2) A battery-free sensor RFID tag (FIG. 1) that, when interrogated with a wireless RF signal, reveals the appearance of failure indicators by backscattering to the RFID reader information about the OFF/ON states of the switches (i.e. information about whether the intensities of the environmental failure indicators are above or below the alarming thresholds). This approach results in the implementation of completely passive, "deploy-and-forget" tags that do not require the installation of batteries inside the panel of the energized equipment and that can be remotely interrogated, at a distance of few meters, to reveal information about the health of the monitored equipment without requiring the operators to physically access and shut down the equipment. Both systems will be packaged in completely self-sustained coin-size wireless units that can be easily retrofitted inside the panels of energized equipment without the need of electrical or optical feedthroughs. Thanks to the unique combination of small footprint, low manufacturing cost, nearly unlimited lifetime, and wireless communication capability, many of such wireless sensor units can be deployed nearly everywhere throughout the power grid enabling continuous and ubiquitous health monitoring with minimum deployment and maintenance costs.

In addition to monitoring power substations or power stations, the single-chip zero-power sensor clusters can be distributed in a factory, an airliner, a remote building, a large piece of heavy machinery, a ship, an oil platform, a petroleum refinery, a pipeline, a railway, an airliner, a drone, an antennae, or a beacon.

Figure 10:
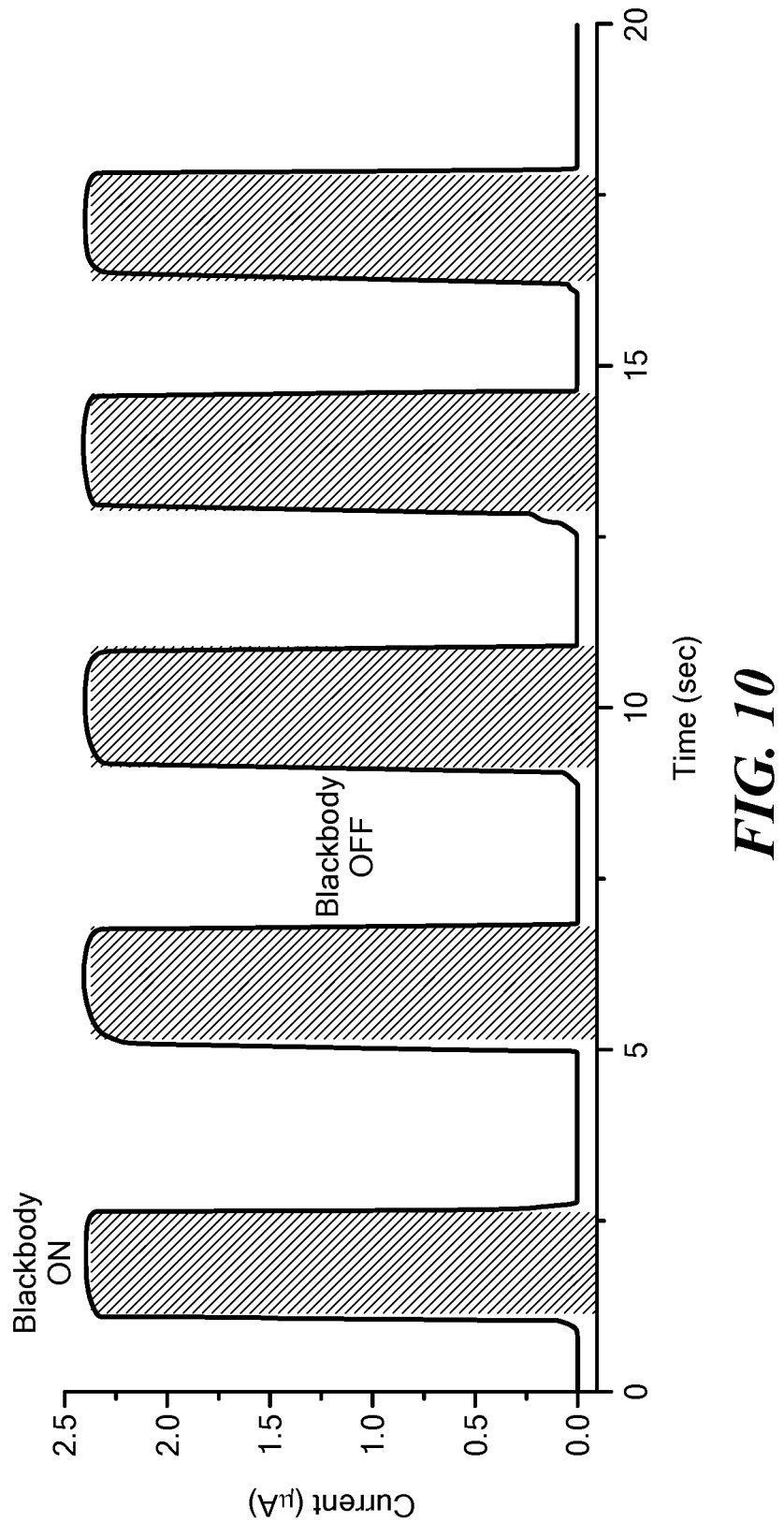
FIG. 10 illustrates measured current (using a sourcemeter with a 10 mV bias) through the zero-power infrared sensor in response to chopped IR radiation emitted by a calibrated blackbody source.

The MPs' contacts (FIG. 1) are typically designed to reopen themselves when above-threshold IR radiation is removed, which is accomplished using a sufficiently-large contact gap to ensure a restoring force larger than contact adhesion forces. The spectral response of a fabricated device was characterized using a Fourier Transform Infrared Spectroscopy (FTIR) microscope. The reference was first measured on the gold reflecting head, then the reflection (R) of the $SiO_2$ dielectric absorber on the absorbing head was measured. Since the optically-thick (~100 nm) continuous Pt plate underneath efficiently suppress the transmitted power (transmittance, T), the absorptance (A) can be calculated as follows assuming negligible transmittance: A=1-R-T=1-R. The fabricated dielectric absorber exhibits the absorption as high as η~98.8% at λ=11.3 μm and consistently high absorption (η>80%) in the wide LWIR regime (λ=8-14 μm) (FIG. 19). The measured absorption shows a good spectral overlap with the emission spectrum of a blackbody at 37° C. (closely representing a human body), which guarantees an effective sampling of the emitted IR power from a human body. FIG. 10 illustrates measured current (using a sourcemeter with a 10 mV bias) through the zero-power infrared (ZIR) sensor in response to chopped IR radiation emitted by a calibrated blackbody source.

Figure 6A:
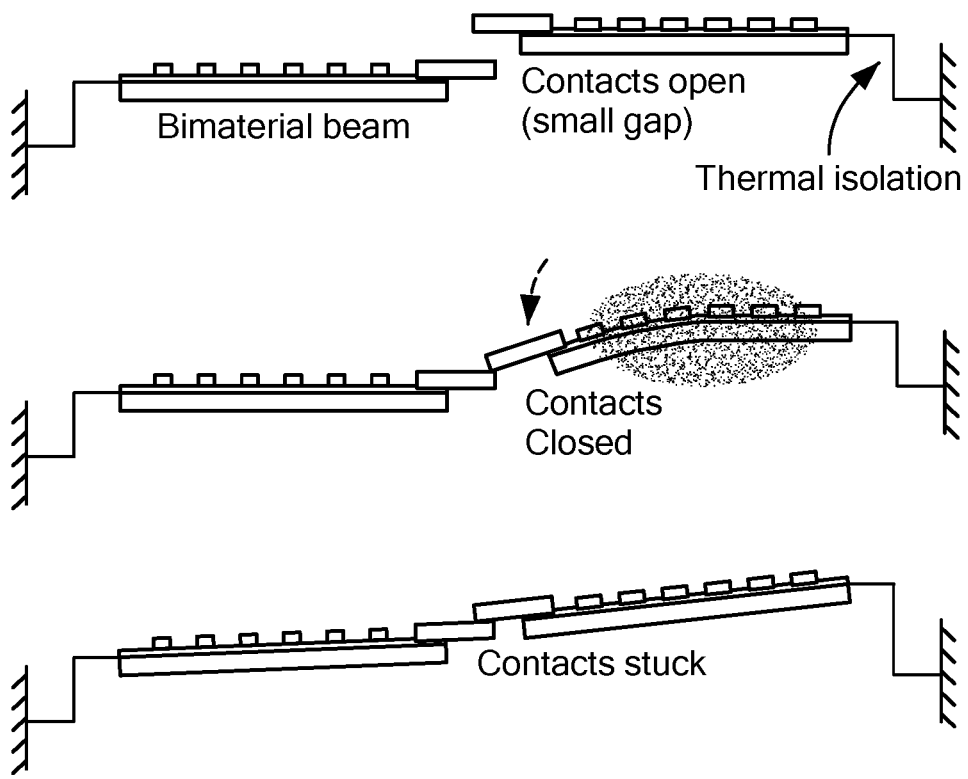
FIG. 6A illustrates a switch closing process in which the contacts close in response to IR radiation absorbed by one head, after which the contacts remain stuck together due to adhesive forces or due to latching together.
Figure 6B:
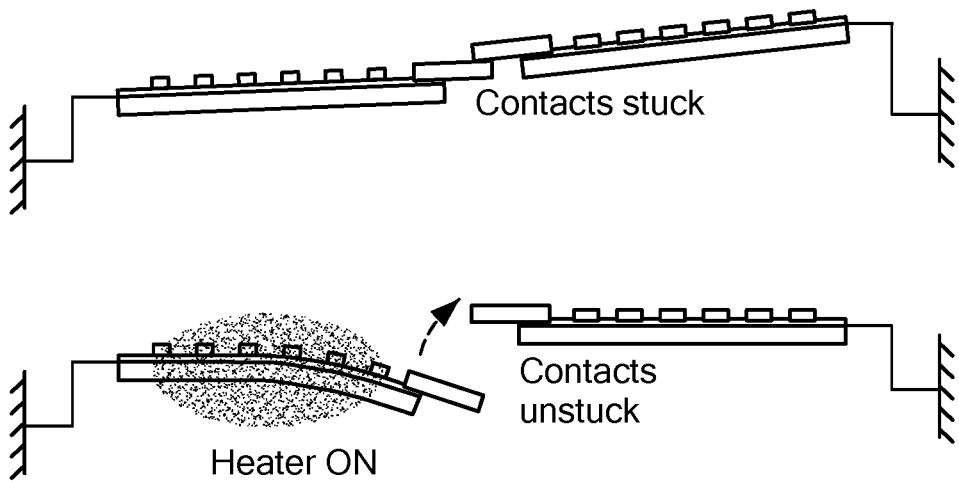
FIG. 6B illustrates a process of releasing the contacts through activation of an electrical heater in the other head of the device, causing the actuating beams to bend downward and open the contact junction.

In the present technology, the contact gap is intentionally reduced (~340 nm, which can be controlled by a sacrificial layer) allowing the adhesion force to latch the contacts after the MP's exposure to targeted IR radiation (FIG. 6A). This latching MP can be connected to the general purpose-input/output (GPIO) port of a commercially-available RFID microchip [3] and can be programmed to return the GPIO state when the tag is interrogated by a reader [4]. Furthermore, a timer-circuit [5] powered by the energy harvested from the reading signal is used to generate a delayed pulse to activate a micro-heater integrated in the MP to auto-reset the contacts after data extraction.

The fabricated latching MP was tested with filtered blackbody radiation in a vacuum chamber. It was connected to the RFID tag while a USB-powered RFID reader was used to interrogate the tag remotely (~3 m away) and detect the backscattered RF signal containing GPIO port state ('1'-open, '0'-closed). A sourcemeter was connected across the MP to verify its state. When interrogated by the reader before and after above-threshold IR exposure (~830 nW), the tag returned '1' and '0' respectively (FIG. 4). A subsequent interrogation, without additional IR exposure, resulted in a returned state '1'-open indicating that the auto-reset reopened the MP at the end of the previous interrogation as designed (FIG. 11).

Figure 11:
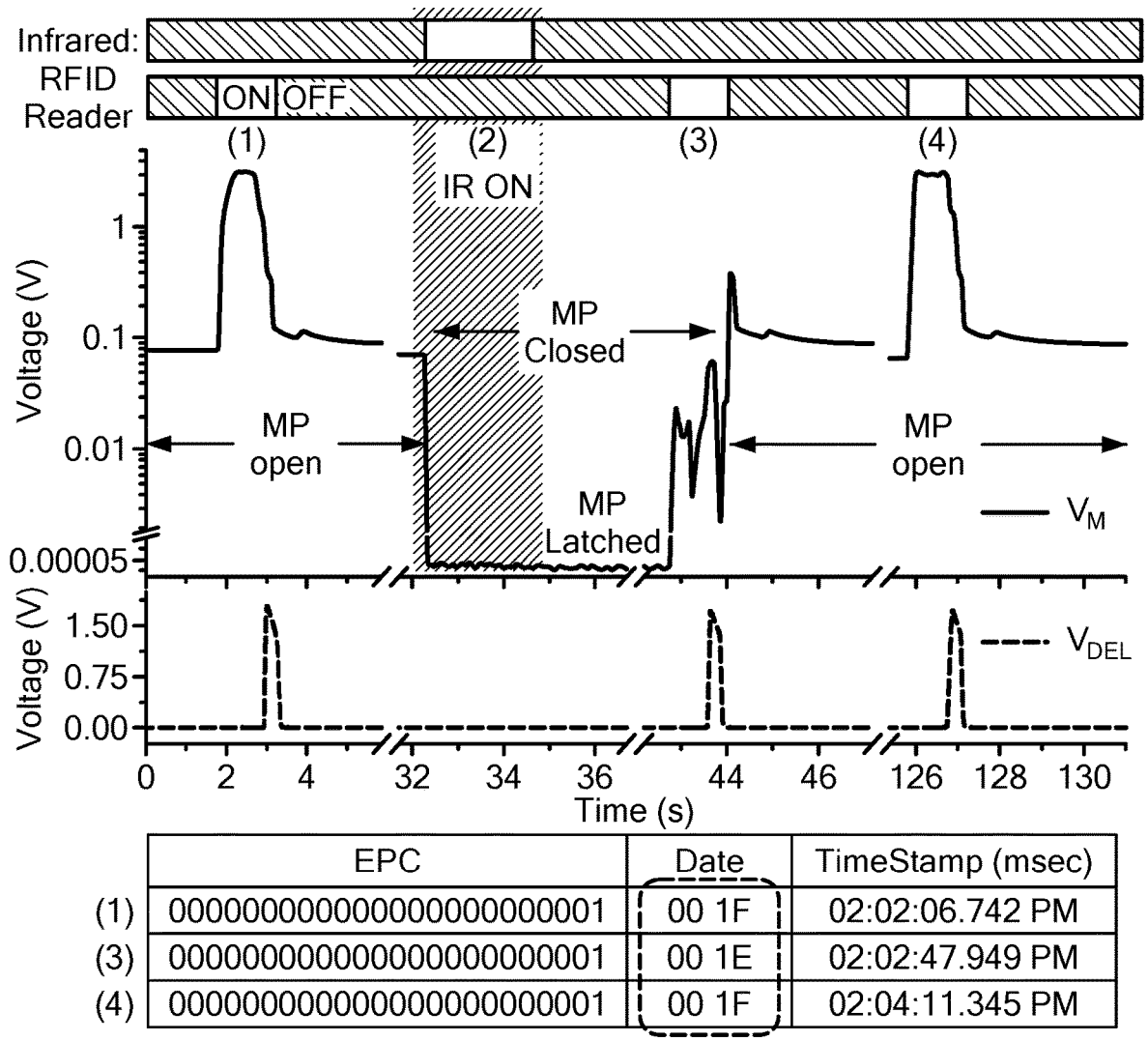
FIG. 11 (top) shows an experiment demonstrating latching of the electrical contacts and unlatching using a heater. At time (1) the IR is OFF, the RFID reader is ON, and micromechanical photoswitch (MP) is open; at time (2) the IR is ON, the RFID reader is OFF, and voltage drops and remains at ~50 μV as the MP (3.3 kΩ) is now latched indefinitely (until reset) and in parallel to 8.1 MΩ; at time (3) IR OFF, reader ON, the $V_{DD}$ is activated and $V_M$ rises but is within the voltage range interpreted as input ON (i.e., close to 0V); the heater resets the MP to open at the end of the read; at time (4) IR OFF, reader ON—the MP is open. In the center plot of FIG. 11, the measured heater voltage $V_{DEL}$ appears as ~0.2 s pulses since $V_{DEL}$ is asserted only 1 s after power-up and the timer is powered only until the end of the read duration (1.2 s). At the bottom of FIG. 11 is a screen shot of the screenshot of the RFID reader software on a laptop showing the GPIO port data (see FIG. 12).

FIG. 11 is a plot (top) illustrating latching of the electrical contacts and unlatching using a heater at the head 2 position; at time (1) the IR is OFF, the RFID reader is ON, and the micromechanical photoswitch (MP) is open; at time (2) the IR is ON, the RFID reader is OFF, and voltage drops and remains at ~50 μV as the MP (3.3 kΩ) is now latched indefinitely (until reset) and in parallel to 8.1 MΩ; at time (3) IR OFF, reader ON, the $V_{DD}$ is activated and $V_M$ rises but is within the voltage range interpreted as input ON (i.e., close to 0V); the heater resets the MP to open at the end of the read; at time (4) IR OFF, reader ON—the MP is open. At the center plot of FIG. 11, the measured heater voltage $V_{DEL}$: appears as ~0.2 s pulses since $V_{DEL}$ is asserted only 1 s after power-up and the timer is powered only until the end of the read duration (1.2 s). At the bottom of FIG. 11 is a screen shot of the screenshot of the RFID reader software on a laptop showing the GPIO port data (see FIG. 12).

Figure 12:
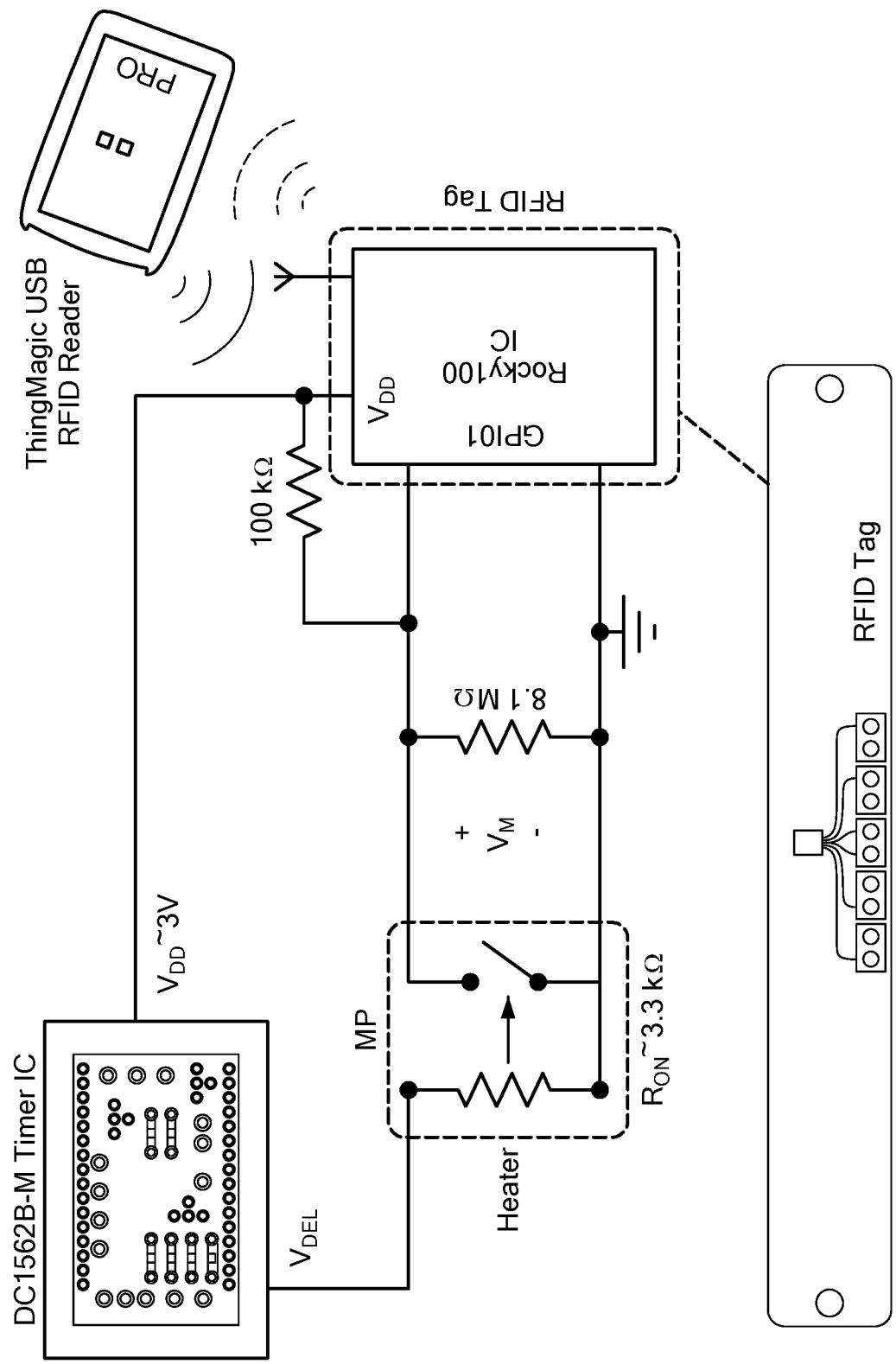
FIG. 12 illustrates the RFID sensor tag used in FIG. 11. The MP is connected to one of the 5 GPIO ports of the microchip. A sourcemeter is set to source 10 nA across the port while measuring voltage $V_M$. This, in parallel with the 8.1 MΩ resistor helps in observing the MP status change when the tag is unpowered. The 100 kΩ acts as a pull-up and current-limiting resistor for the MP. Thus, the GPIO port has a value 001F (11111) for MP open and 001E (11110) for closed. The timer-circuit shares the same supply and when turned ON, sends a 3 V pulse to the heater after a 1 s delay to automatically reset the MP.

FIG. 12 illustrates a schematic of the RFID sensor tag used in FIG. 11. The MP is connected to one of the 5 GPIO ports of the microchip. A sourcemeter is set to source 10 nA across the port while measuring voltage $V_M$. This, in parallel with the 8.1 MΩ resistor helps in observing the MP status change when the tag is unpowered. The 100 kΩ acts as a pull-up and current-limiting resistor for the MP. Thus, the GPIO port has a value 001F (11111) for MP open and 001E (11110) for closed. The timer-circuit shares the same supply and when turned ON, sends a 3 V pulse to the heater after a 1 s delay to automatically reset the MP.

The ZIR sensors can be provided with RFID circuits which consume no power in open circuit or closed circuit states. The ZIR sensors can be provided with batteries and transmitters, for example, consuming no power until the circuit closes and returning to a no-power consuming state after the circuit opens. FIG. 16 illustrates a ZIR sensor on the left, and the ZIR sensor can be placed inside a vacuum package. A battery unit is illustrated at center of FIG. 16 with a load-switch. A wireless microcontroller is illustrated at right. The components of FIG. 16 can represent a kit. When plasmonically-enhanced absorbing heads are utilized, broadband or narrow-band absorbance can be used, and FIG. 21 illustrates some examples of various narrow-band wavelengths that can be specifically targeted by plasmonic heads. As a non-limiting example, FIG. 22 illustrates various IR wavelengths useful for ZIR sensors.

As used herein, the term "about" and "approximately" are defined to being close to as understood by one of ordinary skill in the art. In one non-limiting example, the term "about" and "approximately" are defined to be within 10%, preferably within 5%, more preferably within 1%, and most preferably within 0.5%.

EXAMPLES

Example 1: Blackbody Testing

The function of the device was tested in a vacuum chamber using a calibrated blackbody IR source. The current through the device was monitored using a sourcemeter with a constant bias of 10 mV, while the blackbody radiation is manually chopped. Several consecutive ON/OFF cycles were recorded when the device was exposed to chopped broadband IR radiation (FIG. 10). The minimum absorbed power to trigger the device ON was estimated based on the measured absorption spectrum and the calibrated power density, and found to be ~140 nW. The achieved detection threshold corresponded to a minimum detectable IR power density of ~6.2 W/m$^2$, which is equivalent to the IR radiation collected from a human body at 5.7 m distance, with a 25 mm focal length lens. The same high-stiffness bowl-shaped Pt contact shown in the lower right of FIG. 1 was employed in the LWIR MPs, which guarantees the outstanding reliability with numerous consecutive ON/OFF cycles (up to 8000 cycles measured). It is worth noting that a blackbody temperature of 300° C. had to be used to deliver to the sensor a power density equivalent to the one that would be received from a 37° C. human body without the attenuation of the vacuum chamber window. That is, the inherent absorption in CaF$_2$ optics limits the transmission and allows only a fraction of the available power from the blackbody in LWIR regime.

REFERENCES

[1] M. Shankar, "Human-tracking systems using pyroelectric infrared detectors," Opt. Eng., vol. 45, no. 10, p. 106401, October 2006.
[2] "Low-Power PIR Motion Detector With Sub-1 GHz Wireless Connectivity Enabling 10-Year Coin Cell Battery Life," Texas Instruments, 2016. [Online]. Available: http://www.ti.com/lit/ug/tiduau1b/tiduau1b.pdf.
[3] R. H. Olsson, R. B. Bogoslovov, and C. Gordon, "Event driven persistent sensing: Overcoming the energy and lifetime limitations in unattended wireless sensors," in 2016 IEEE SENSORS, 2016, pp. 1-3.
[4] Z. Qian, S. Kang, V. Rajaram, C. Cassella, N. E. McGruer, and M. Rinaldi, "Zero-power infrared digitizers based on plasmonically enhanced micromechanical photoswitches," Nat. Nanotechnol., vol. 12, no. 10, pp. 969-973, September 2017.
[5] Z. Qian, S. Kang, V. Rajaram, C. Cassella, N. E. McGruer, and M. Rinaldi, "Zero-power light-actuated micromechanical relay," in IEEE MEMS, 2017, pp. 940-941.
[6] V. Rajaram, Z. Qian, S. Kang, and M. Rinaldi, "MEMS-Based Near-Zero Power Infrared Wireless Sensor Node," in IEEE MEMS, 2018, pp. 17-20.
[7] V. Rajaram, Z. Qian, S. Kang, C. Cassella, N. E. McGruer, and M. Rinaldi, "Microelectromechanical detector of infrared spectral signatures with near-zero standby power consumption," in 19th International Conference on Solid-State Sensors, Actuators and Microsystems (TRANSDUCERS), 2017, pp. 846-849.
[8] S. Kang, Z. Qian, V. Rajaram, A. Alu, and M. Rinaldi, "Ultra narrowband infrared absorbers for omni-directional and polarization insensitive multi-spectral sensing microsystems," in 19th International Conference on Solid-State Sensors, Actuators and Microsystems (TRANSDUCERS), 2017, pp. 886-889.
[9] A. Lehmann, L. Schumann, and K. Hubner, "Optical Phonons in Amorphous Silicon Oxides. I. Calculation of the Density of States and Interpretation of Lo-To Splittings of Amorphous Sio2," Phys. status solidi, vol. 117, no. 2, pp. 689-698, June 1983.
[10] G. Paoletti, et al. "Monitoring of electrical equipment failure indicators and zero-planned outages: Past, present and future maintenance practices", 61st IEEE Pulp and Paper Industry Conference (PPIC), 2015.
[11] S. Kang. et al. "Broadband LWIR Micromechanical Photoswitch For Zero-Power Human Detection", submitted.
[12] S. Singamaneni, et al. "Polymer-silicon flexible structures for fast chemical vapor detection", Advanced materials 19.23 (2007): 4248-4255.
[13] J. Zhang, et al., "A review of passive RFID tag antenna-based sensors and systems for structural health monitoring applications", Sensors, vol. 17, no. 2, pp. 265, January 2017.
[14] Farsens, "EPC C1G2 Batteryless Switch Monitor", EVAL01-X5-R Datasheet, January 2018.
[15] ThingMagic, "USBPro RFID Reader", USB-6EP Datasheet, February 2017.
[16] Linear Technology, "Demo Manual", DC1562B datasheet, 2004.

The invention claimed is:
1. A device for monitoring a heat source, the device comprising:
(i) one or more zero power infrared (IR) sensors, each sensor comprising a first plasmonic absorber tuned to a selected wavelength range of IR radiation and comprising a switch actuatable using only energy of IR radiation absorbed by the plasmonic absorber; wherein the one or more zero power IR sensors are disposed within a circuit in series or in parallel, and wherein the circuit is interruptable by the switch of each sensor;
(ii) a transmitter disposed within the circuit and activatable by a selected configuration of said switches; and
(iii) optionally a battery disposed within the circuit, the battery capable of powering the transmitter;
wherein absorption by the one or more sensors of selected wavelengths of IR radiation originating from the heat source and characteristic of a heat emission from the source causes the transmitter to transmit an electromagnetic radiation signal.

2. The device of claim 1, wherein the device comprises four or more of said zero power IR sensors, each comprising a plasmonic absorber tuned to a different selected wavelength range of IR radiation, wherein the switch of each of the four or more sensors is set to a different selected activation power, and wherein the device functions as an IR analyzer with at least 4 bit resolution.

3. The device of claim 2, wherein the radio transmission from the device is activated when said IR radiation originating from a heat source satisfies selected IR spectral criteria characteristic of detection of the heat source or an out of range heat emission from the heat source.

4. The device of claim 1, wherein the device detects LWIR radiation emitted by a human body.

5. The device of claim 1, wherein at least one sensor of the device comprises a second plasmonic absorber tuned to a different IR wavelength range than the first plasmonic absorber, and relative absorption of IR radiation by the first and second plasmonic absorbers determines an open/closed state of the sensor switch.

6. The device of claim 1, wherein one or more of the sensors comprises a heater operative to reset the sensor switch.

7. The device of claim 1, further comprising a focusing lens for collecting said infrared radiation.

8. The device of claim 1, wherein the transmitter is an RFID tag activatable by an altered switch status of a sensor of the device.

9. The device of claim 1, wherein a sensor of the device comprises a switch having first and second contacts with an engineered adhesion force or latching force, such that the first contact and the second contact stably adhere after the contacts close, thereby providing a memory function wherein the sensor switch remains in the closed contact position after an incoming signal dissipates.

10. The device of claim 1, wherein the heat source or potential heat generation source is selected from the group consisting of human bodies within a building, power transmission equipment, power generation equipment, communications equipment, a pump, a generator, a boiler, HVAC equipment, oil extraction equipment, oil refinery equipment, chemical plant equipment, pipeline equipment, motor vehicles, and factory equipment.

11. A system for monitoring a heat source or potential heat generation source, the system comprising:
(i) a plurality of devices of claim 1; and
(ii) a receiver or RFID reader capable of monitoring transmissions from the plurality of devices.

12. The system of claim 11, further comprising:
(iii) a processor and a memory capable of storing and/or analyzing information captured by said receiver or RFID reader.

13. The system of claim 12, further comprising:
(iv) an alarm, a camera, a cooling system, a controller of the heat source, a controller of an HVAC system, or a fire prevention system.

14. The system of claim 11, wherein the system comprises one or more zero power IR sensors and at least one other type of sensor.

15. The system of claim 14, wherein the other type of sensor detects temperature, humidity, or sound.

16. The system of claim 11, wherein the devices of the system do not comprise any batteries.

17. The system of claim 11, wherein the plurality of devices are distributed at fixed positions near a plurality of heat sources or potential heat generation sources in an industrial facility, power transmission facility, power generation facility, oil rig or oil field, oil refinery, chemical plant, pipeline, motor vehicle roadway or parking facility, or a building.

18. A kit for monitoring a heat source or potential heat generation source, the kit comprising a plurality of devices of claim 1 and instructions for deploying and using the devices.

19. A method of monitoring equipment in a facility, the method comprising:
(a) deploying a plurality of devices of claim 1 in the facility within a distance from the equipment suitable for detecting an out of range heat generation of the equipment using the devices; and
(b) periodically monitoring the devices.

20. A method of monitoring people in a building, the method comprising:
(a) deploying a plurality of devices of claim 1 in the building within a space likely to be occupied by people; and
(b) periodically monitoring the devices to determine occupancy of the space.

* * * * *